US008768620B2

(12) United States Patent  (10) Patent No.: US 8,768,620 B2
Miller et al.  (45) Date of Patent: Jul. 1, 2014

(54) NAVIGATIONAL DEPLOYMENT AND INITIALIZATION SYSTEMS AND METHODS

(75) Inventors: Paul A. Miller, Harmony, PA (US); Christopher Evan Watson, Monroeville, PA (US); Scott R. Pavetti, Springdale, PA (US); Thomas Trautzsch, Cranberry Township, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 0 days.

(21) Appl. No.: 13/558,915

(22) Filed: Jul. 26, 2012

(65) Prior Publication Data

US 2013/0030700 A1 Jan. 31, 2013

Related U.S. Application Data

(60) Provisional application No. 61/512,102, filed on Jul. 27, 2011.

(51) Int. Cl.
*G01C 21/26* (2006.01)

(52) U.S. Cl.
USPC .......................................................... 701/500

(58) Field of Classification Search
USPC ......... 701/207, 412, 500–502, 508, 515, 519; 340/8.1, 989, 991; 455/168.1, 179.1, 455/180.1, 180.2, 456.1, 456.3, 456.6
See application file for complete search history.

(56) References Cited

U.S. PATENT DOCUMENTS 5,583,776 A 12/1996 Levi et al.
5,671,160 A 9/1997 Julian
5,724,265 A 3/1998 Hutchings
5,899,963 A 5/1999 Hutchings
6,014,608 A 1/2000 Seo
6,122,960 A 9/2000 Hutchings et al.
6,305,221 B1 10/2001 Hutchings
8,185,101 B1* 5/2012 Wiseman et al. .......... 455/422.1
2004/0021569 A1 2/2004 Lepkofker et al.
(Continued)

FOREIGN PATENT DOCUMENTS

EP 1847807 A1 10/2007
EP 2040036 A2 3/2009

OTHER PUBLICATIONS

Foxlin, Pedestrian Tracking with Shoe-Mounted Inertial Sensors, IEEE Computer Society, Nov.-Dec. 2005, pp. 38-46.

(Continued)

*Primary Examiner* — Mary Cheung
*Assistant Examiner* — Rodney Butler
(74) *Attorney, Agent, or Firm* — The Webb Law Firm

(57) ABSTRACT

A navigational deployment and initialization system, including: at least one personal inertial navigation module associated with at least one user and comprising a plurality of sensors and at least one controller configured to generate navigation data derived at least in part upon output of the plurality of sensors and at least one navigation routine; at least one deployment recognition device configured to directly or indirectly receive at least one of the following: user data, time data, event data, navigation data, or any combination thereof; and at least one central controller in direct or indirect communication with the at least one deployment recognition device and configured to receive at least a portion of at least one of the following: the user data, the time data, the event data, the navigation data, or any combination thereof.

23 Claims, 4 Drawing Sheets

(56) References Cited

U.S. PATENT DOCUMENTS

| | | | |
|---|---|---|---|
| 2005/0011720 A1* | 1/2005 | Adair et al. | 192/113.36 |
| 2005/0227650 A1* | 10/2005 | Williams | 455/179.1 |
| 2006/0155584 A1* | 7/2006 | Aggarwal | 705/3 |
| 2008/0077326 A1 | 3/2008 | Funk et al. | |
| 2008/0129599 A1 | 6/2008 | Thomas et al. | |
| 2009/0221298 A1 | 9/2009 | Hanner | |
| 2009/0254276 A1 | 10/2009 | Faulkner et al. | |
| 2010/0131192 A1 | 5/2010 | Clark | |
| 2011/0054836 A1 | 3/2011 | Foxlin | |
| 2011/0098921 A1 | 4/2011 | Miller et al. | |
| 2012/0274447 A1* | 11/2012 | Hess | 340/8.1 |

OTHER PUBLICATIONS

Ali et al., Alignment of Strapdown Inertial Navigation System: A Literture Survey Spanned over the Last 14 years, pp. 1-12.

Gebre-Egziabher et al., A Gyro-Free Quaternion-Based Attitude Determination System Suitable for Implementation Using Low Cost Sensors, Position Location and Navigation Symposium IEEE, 2000, pp. 185-192.

Alonso et al., Centering and Observability in Attitude-Independent Magnetometer-Bias Determination, The Journal of the Astronautical Sciences, Apr.-Jun. 2003, pp. 133-141, vol. 51, No. 2.

Alonso et al., TWOSTEP: A Fast Robust Algorithm for Attitude-Independent Magnetometer-Bias Determination, The Journal of the Astronautical Sciences, Oct.-Dec. 2002, pp. 433-451, vol. 50, No. 4.

Vasconcelos et al., A Geometric Approach to Strapdown Magnetometer Calibration in Sensor Frame, 2nd IFAC Workshop Navigation, Guidance, and Control of Underwater Vehicles, 2008, vol. 2, Part 1, Lakeside Hotel, Ireland.

Markley, Fast Quaternion Attitude Estimation from Two Vector Measurements, Journal of Guidance, Control, and Dynamics, 2002, pp. 411-414, vol. 25, No. 2.

Crassidis et al., Real-Time Attitude-Independent Three-Axis Magnetometer Calibration, Journal of Guidance, Control, and Dynamics, 2005, pp. 115-120, vol. 28, No. 1.

Alonso et al., Attitude-Independent Magnetometer-Bias Determination: A Survey, The Journal of the Astronautical Sciences, Oct.-Dec. 2002, pp. 453-475, vol. 50, No. 4.

Thomasson et al., Understanding the Fresnel Zone, Oct. 1996, 2 pages.

Woodman, An Introduction to Inertial Navigation, Technical Report No. 696, University of Cambridge Computer Laboratory, Aug. 2007, pp. 1-37.

Motorola's Canopy Wireless Broadband Platform: The Secure, Flexible, Reliable Wireless Solution for Building or Extending Your Broadband Network, Motorola, 2006, available at http://www.ptsupply.com/pdf/motorola_canopy_CanopyOverview-US.pdf.

Motorola Canopy Wireless Broadband 900 MHz Modules: Providing Reliable Broadband Service to Remote Customers with Canopy System 900 MHz Modules, Motorola, 2004, available at http://www.motorola.com/web/Business/_Documents/static%20files/900%20Mhz%20Module.

Motorola Canopy Wireless Broadband 2.4 GHz System, Motorola, 2003, available at http://www.motorola.com/web/Business/_Documents/static%20files/2.4%20GHz%20Canopy%20System.pdf?pLibItem=1&localeId=33.

Lehr et al., Wireless Internet Access: 3g vs. WiFi?, Telecommunications Policy, 2003, pp. 351-370, vol. 27.

Faulkner et al., GPS-denied Pedestrian Tracking in Indoor Environments Using an IMU and Magnetic Compass, Jun. 20, 2011, pp. 1-7.

* cited by examiner

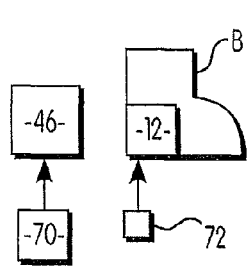 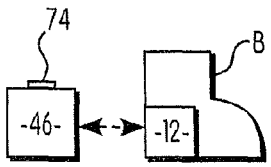 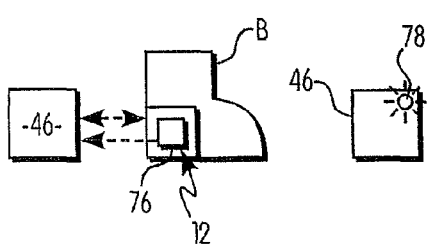
FIG. 7(a)   FIG. 7(b)   FIG. 7(c)   FIG. 7(d)
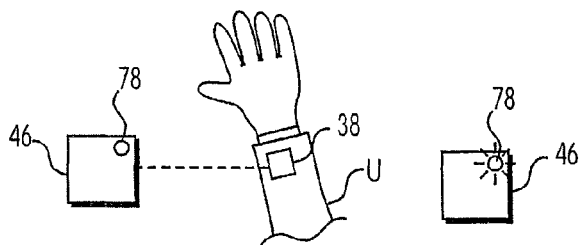
FIG. 7(e)   FIG. 7(f)
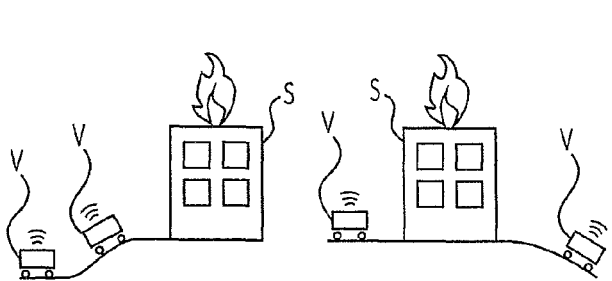 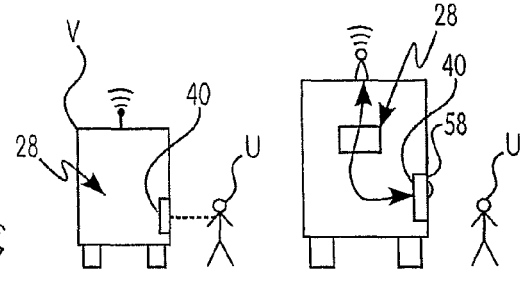
FIG. 8(a)   FIG. 8(b)   FIG. 8(c)   FIG. 8(d)
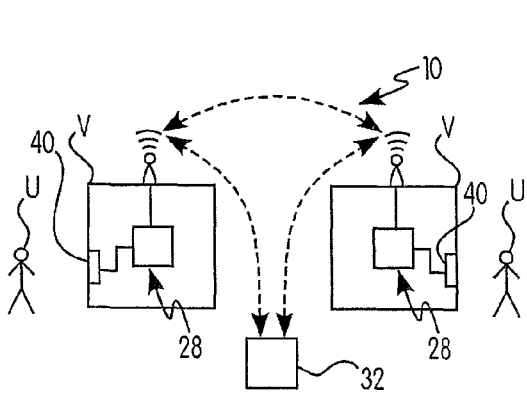 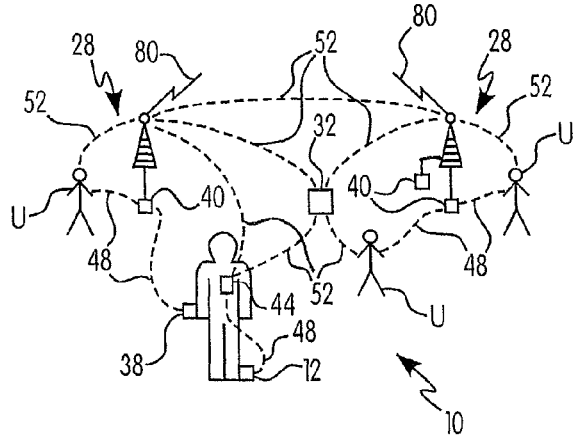
FIG. 8(e)   FIG. 9

NAVIGATIONAL DEPLOYMENT AND INITIALIZATION SYSTEMS AND METHODS

CROSS REFERENCE TO RELATED APPLICATIONS

This application claims benefit of priority from U.S. Provisional Patent Application No. 61/512,102, filed Jul. 27, 2011, which is incorporated herein by reference in its entirety.

BACKGROUND OF THE INVENTION

1. Field of the Invention

The present invention relates generally to navigation systems and processes, and in particular to navigational deployment and initialization systems and methods, for use in connection with navigation-required environments and systems, including an inertial navigation-based system with multiple users navigating in a specified area or location.

2. Description of the Related Art

Inertial navigation systems are used and applied in various situations and environments that require accurate navigation functionality without the necessary use of external references during the navigational process. For example, inertial navigation systems and methods are used in many indoor environments (wherein a Global Navigation Satellite System, e.g., the Global Positioning System (GPS), is unusable or ineffective), such as in connection with the navigational activities of an emergency responder in a structure, building, or at a particular scene or location. However, in order to be effective, inertial navigation systems must initialize with estimate data, which may include data pertaining to the sensor position, velocity, orientation, biases, noise parameters, and other navigation-related data. In particular, for applications without external position or common azimuth references, a system must exist to correlate a personal inertial navigation module relative position output or series of relative position outputs (e.g., track) and relative azimuth with some reference (e.g., another user or track, structure, external reference, etc.).

Further, such as in pedestrian navigation applications, where each personal inertial navigation module is attached to a user (e.g., the boot of a firefighter), a system should relate the relative position of multiple users in the same frame of reference. For example, this relationship provides knowledge for one user to locate another user in the absence of external knowledge or aids. This further permits a command user to track multiple users navigating in the same environment. Following initialization and/or turn-on, inertial navigation systems require ongoing analysis and correction to mitigate drift, bias, noise, and other external factors that affect the accuracy of these sensors and systems.

Orientation determination is a requirement for most navigation systems. In certain existing systems, an Attitude Heading Reference System (AHRS) is implemented using gyroscopes that are updated with gravity sensors (pitch and roll) and magnetic field sensors (yaw), all having excellent long-term bias stability, i.e., minimal or no drift. However, the effective use of an AHRS in connection with low-cost inertial sensors requires computationally efficient and robust algorithms to initialize and account for sensor noise and bias drift. Accordingly, one important goal in inertial navigation-based navigation systems is the minimization or elimination of the bias drift, whether through improvement of the physical hardware or improvement of the algorithms and routines used during the navigational process.

Position is a requirement of most navigation systems. In certain existing systems, sensors may provide information relating to position, thereby allowing an algorithm to compute or derive position. In other systems, the sensor suite may not provide sufficient information to effectively derive position, and therefore may require an initial position estimate for which the system propagates thereafter. A user, device, marker, or other external source may provide such a position estimate. Of particular importance in first responder applications, e.g., emergency situation location and navigation, where the sensor suite may not provide sufficient information to effectively derive position, is the establishment of a single initial position estimate, whereby the navigation routines or algorithms initialize and place all users in a common frame of reference without any onerous procedural or physical requirements by the user. It is also recognized that location systems that provide or generate a graphical user path (such as at a central controller, e.g., an incident commander's computing device), require accurate track shape and relative track positioning between navigating users to improve situational awareness and accurate location management.

One known initialization and deployment approach uses one or more mats to establish a common coordinate system and heading between all firefighters. For example, such a system is at least partially described in U.S. Publication No. 2011/009821, the contents of which are incorporated herein by reference in their entirety. In such a single-mat approach, the mat may contain an array of markers that indicate the firefighter's horizontal sensor position relative to the mat's origin. As the firefighter walks across the mat, the boot-mounted inertial navigation module recognizes these inputs and aligns the module (and, thus, the user) coordinate system to match the coordinate system of the mat. A two-mat approach may also be used, where the relative position and orientation between each mat is arbitrary. In this arrangement, it is assumed that each mat represents one point, where the common coordinate system has the origin at the first mat and the x-axis extending from the first mat to the second mat. This provides a common heading or azimuth for each user.

It is recognized that certain situations or environments may not be amenable to a single- or two-mat-based solution. For example, following the deployment of the mats, these mats must remain stationary throughout the entire incident, such that all users initialize relative to the same reference, i.e., are positioned in a common navigation frame of reference. A small rotation or movement of a mat could result in significant horizontal error between those users initialized before and after this movement. In addition, the location or position of the mat must be consistent or its use for positioning the users in the common frame of reference will be altered or lost. Still further, these mats require precise location measurements for accurate azimuth alignment. The structure of the marker or mat may lead to issues based on mat size, mat weight, mat storage and transport, and deployment technique during the deployment process in an emergency situation. Effective deployment may require a substantially flat surface, where uneven ground will not allow the mat to lie flat, which may introduce other inaccuracies in the system. A convenient deployment location may not exist in the environment, and weather conditions may also affect or inhibit deployment.

As discussed above, it is important to understand the position of users relative to other users and/or other reference points or features navigating in or positioned at the location or scene. This allows for all users and various reference points or features to be placed in a common (e.g., global) frame of reference for accurate tracking. Accordingly, the processes for determining initial position and facilitating subsequent deployment of multiple users on or at the scene are critical for accurate tracking of the user in a common frame of reference.

In addition, minimizing the user requirements to obtain and/or determine this initial position or location is beneficial.

SUMMARY OF THE INVENTION

Generally, the present invention provides navigational deployment and initialization systems and methods that address or overcome certain drawbacks and deficiencies existing in known navigation systems. Preferably, the present invention provides navigational deployment and initialization systems and methods that are useful in connection with navigation systems relying on inertial navigation techniques as the primary navigational component for users in the environment. Preferably, the present invention provides navigational deployment and initialization systems and methods that facilitate the accurate initial and/or subsequent location in a common frame of reference. Preferably, the present invention provides navigational deployment and initialization systems and methods that allow for single or multiple initial and subsequent entry points to the users into the environment. Preferably, the present invention provides navigational deployment and initialization systems and methods that minimize the user requirements for initialization and/or deployment.

In one preferred and non-limiting embodiment, provided is a navigational deployment and initialization system, including: at least one personal inertial navigation module associated with at least one user and comprising a plurality of sensors and at least one controller configured to generate navigation data derived at least in part upon output of the plurality of sensors and at least one navigation routine; at least one deployment recognition device configured to directly or indirectly receive at least one of the following: user data, time data, event data, navigation data, or any combination thereof; and at least one central controller in direct or indirect communication with the at least one deployment recognition device and configured to receive at least a portion of at least one of the following: the user data, the time data, the event data, the navigation data, or any combination thereof.

In another preferred and non-limiting embodiment, provided is a computer-implemented method of determining a position of at least one deployment recognition device in a common frame of reference in which a plurality of users are navigating, each user having at least one personal inertial navigation module associated therewith and comprising a plurality of sensors and at least one controller configured to generate navigation data derived at least in part upon output of the plurality of sensors and at least one navigation routine. The computer-implemented method includes: receiving, by the at least one deployment recognition device, at least a portion of the navigation data of the at least one personal inertial navigation module of a user; and determining, by the at least one deployment recognition device, a position in the common frame of reference based at least in part upon at least a portion of the navigation data of the at least one personal inertial navigation module of the user.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIGS. 7($a$)-($f$) are schematic views of steps in a process used in one embodiment of a navigational deployment and initialization system according to the principles of the present invention;

FIGS. 8($a$)-($e$) are schematic views of steps in an initialization and deployment process of another embodiment of a navigational deployment and initialization system according to the principles of the present invention;

FIG. 9 is a schematic view of a further embodiment of a navigational deployment and initialization system according to the principles of the present invention.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention relates to a navigational deployment and initialization system 10 and computer-implemented methods and processes of determining a position, such as the position of a user navigating in an identified environment and/or at least one deployment recognition device, in a common frame of reference, with particular use in the fields of navigation, such as in inertial-based navigation system, location tracking, and emergency scene management. Specifically, the presently-invented system 10 and methods can be used in connection with a variety of applications and environments, including, but not limited to, outdoor navigation, indoor navigation, tracking systems, resource management systems, emergency environments, fire fighting events, emergency response events, warfare, and other areas and applications that are enhanced through effective feature tracking, mapping, and/or modeling.

In addition, it is to be understood that the system 10 and associated methods can be implemented in a variety of computer-facilitated or computer-enhanced architectures and systems. Accordingly, as used hereinafter, a "controller," a "central controller," and the like refer to any appropriate computing device that enables data receipt, processing, and/or transmittal. In addition, it is envisioned that any of the computing devices or controllers discussed hereinafter include the appropriate firmware and/or software to implement the computer-based processing steps and programs of the present invention, thus making these devices specially-programmed units and apparatus. Further, as used hereinafter, a "communication device" and the like refer to any appropriate device or mechanism for transfer, transmittal, processing, and/or receipt of data, regardless of format. Still further, such data communication may occur in a wireless (e.g., short-range radio, long-range radio, Bluetooth®, and the like) format or hard-wired format, and provide for direct or indirect communication.

Figure 1:
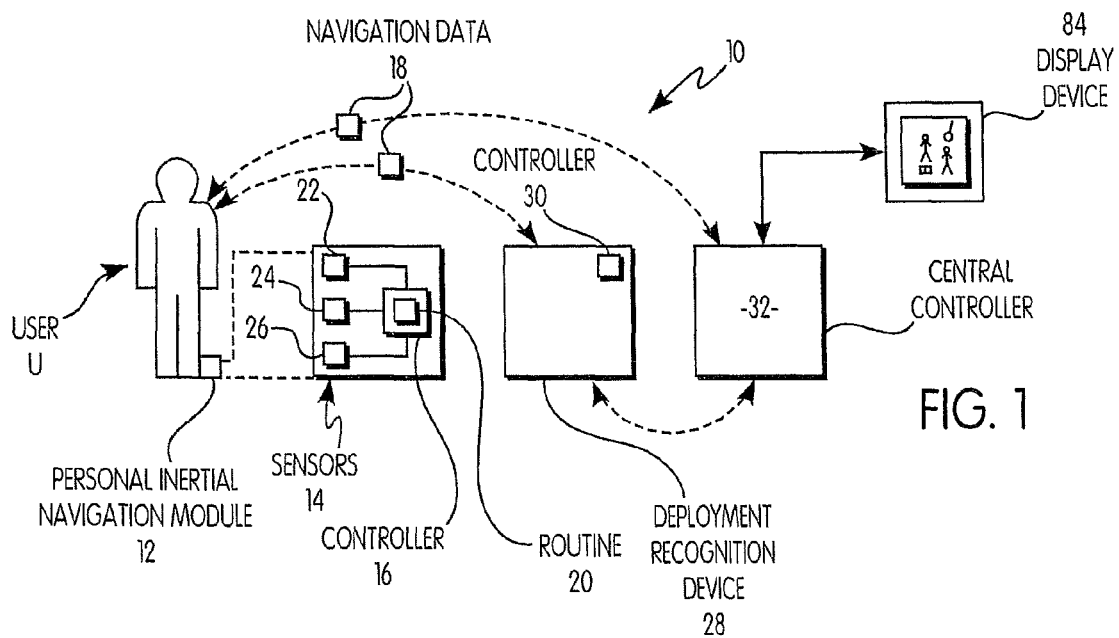
FIG. 1 is a schematic view of one embodiment of a navigational deployment and initialization system according to the principles of the present invention.

As illustrated in schematic form in FIG. 1, and in one preferred and non-limiting embodiment, the navigational deployment and initialization system 10 of the present invention includes at least one personal inertial navigation module 12, which is associated with a user U. This personal inertial navigation module 12 includes multiple sensors 14, and at least one controller 16 configured or programmed to obtain data from the sensors 14 and generate navigation data 18 derived at least in part upon output of the sensors 14 and at least one navigation routine 20 (i.e., software instructions, computational processes, and/or algorithms). As is known, these sensors 14 may include one or more accelerometers 22, gyroscopes 24, magnetometers 26, and the like. In addition, these sensors 14 may sense and generate data along multiple axes, such as through the user of an accelerometer triad, a gyroscope triad, and a magnetometer triad. The controller 16 obtains raw, pre-processed, and/or processed data from the sensors 14, and uses this data to generate navigation data specific to the user U in the user's U navigation frame of reference at least partially through the use of the navigation routine 20.

While the personal inertial navigation module 12 may be attached or associated with a user U in any known location on the body of the user U, one preferred and non-limiting embodiment provides for some attachment arrangement or mechanism for removably attaching the module 12 to the user's boot B. Attachment to the user's foot or foot area is well known in the art of personal inertial navigation, primarily based upon the stationary position of the foot during user movement, whether walking, running, crawling, etc.

As further illustrated in schematic form in FIG. 1, the system 10 includes one or more deployment recognition devices 28, and these deployment recognition devices 28 includes at least one controller 30 configured or programmed to directly or indirectly receive certain data sets and facilitate certain communication links. For example, the deployment recognition device 28, and specifically the controller 30 of the device 28, is programmed or configured to transmit, process, and/or receive user data (e.g., data that is associated with or directed to the user U or any of his or her equipment or components), time data (e.g., data that is used to synchronize the various data sets that are being communicated through the various components of the system 10, such as time data associated with one or more positioning systems (e.g., Global Positioning System (GPS) time data), or the like), event data (e.g., data that is associated with some interaction, activity, and/or occurrence by and/or between the various components of the system 10 and/or the user U), and/or navigation data (e.g., navigation data 18 associated with each particular user U, and/or navigation data associated with any of the navigational activities and processes occurring or implemented in the system 10). As discussed hereinafter, and in one preferred and non-limiting embodiment, the user U directly or indirectly interacts with the deployment recognition device 28 before, during, and/or after some event, e.g., an emergency event.

In this preferred and non-limiting embodiment, the system 10 further includes at least one central controller 32, which is operable to directly or indirectly receive some or all of the data directly or indirectly transmitted by: one or more of the personal inertial navigation modules 12 of each user U; one or more deployment recognition devices 28; and/or any of the various components and operating units within or in communication with any component of the system 10 of the present invention. Based at least partially upon the navigation data 18 and data received directly or indirectly from the deployment recognition device 28, the central controller 32 is programmed or configured to generate data to display visual models, scenes, and/or representations of the various users U and other resources and objects at the scene in a common frame of reference (which, in some instances, may represent a global frame of reference) on at least one display device 84.

This common frame of reference refers to a navigation frame of reference that is common to one or more users, features, positions, and the like. Further, navigation in this common frame of reference is necessary in order to track multiple discrete persons, items, features, and other objects with respect to each other in the same environment. Accordingly, when used with multiple users U, features, and/or other items or objects with traceable positions, the central controller 32 facilitates appropriate data processing and management in order to "place" these personnel, features, objects, items, and the like on or within a common map or model. Therefore, and in the context of emergency scene management, the central controller 32 represents the (typically remote) computer station or computing device that assists a control user, e.g., the incident commander, in managing the event or situation.

Figure 2:
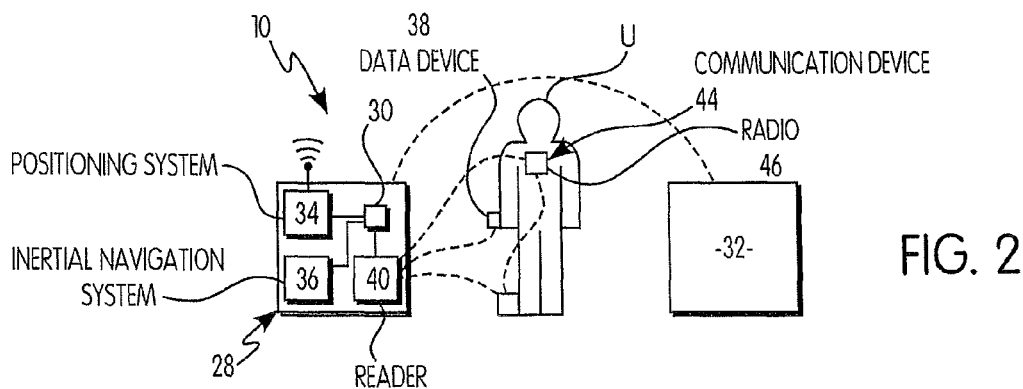
FIG. 2 is a schematic view of another embodiment of a navigational deployment and initialization system according to the principles of the present invention.

In one preferred and non-limiting embodiment, and with reference to FIG. 2, the deployment recognition device 28 may include at least one positioning system 34 that is programmed or configured to determine a position of the deployment recognition device 28 in the common frame of reference. For example, this positioning system 34 may be in the form of a Global Positioning System (GPS), a Geographic Information System (GIS), a navigation-enabled system, a radio frequency-ranging system, an inertial navigation system, or any combination of such positioning processes and arrangements. In certain embodiments, the use of the positioning system 34 allows for the synchronization between the determined position of the deployment recognition device 28 from, for example, satellite information in the GPS, and the common frame of reference discussed above, such as the navigation frame of reference of the users U. Furthermore, the use of such separate systems (e.g., the GPS arrangement) leads to commonality between a global frame of reference and the common (i.e., navigation) frame of reference at the scene.

In a further preferred and non-limiting embodiment, the deployment recognition device 28 is programmed or configured to determine or obtain its position in a common frame of reference based upon at least a portion of the navigation data 18 generated by the personal inertial navigation module 12 of one or more users U. In particular, as opposed to obtaining, generating, determining, or setting its position based upon the above-discussed separate positioning system 34, the controller 30 of the deployment recognition device 28 can be programmed or configured to generate, determine, set, and/or obtain its position based partially or wholly upon the position of the user U, i.e., the personal inertial navigation module 12 of the user U. Therefore, the navigation data 18 of one or more of the users U navigating in the common frame of reference can be used in setting the position of one or more of the deployment recognition devices 28 in this common frame of reference.

Of course, it should be recognized that certain offsets or tolerances should be programmed or configured based upon the physical separation (or spacing) between the user U (or the data transferring/communication device of the user U), the various components of the deployment recognition device 28, and any other communicating components of the system 10. Such an offset can be based upon the maximum distance for effective communication between the user U, e.g., the personal inertial navigation module 12 of the user U, a component (such as an radio frequency identification tag) of the user U, or any other communicating devices that are physically separated, which result in a position offset. Such offsets can be dynamically determined, statically set, set at a certain maximum value, assumed for certain situations or environments, or the like. By associating the user U with the deployment recognition device 28, all in a common frame of reference, points of origin and subsequent navigational points can be accurately determined and placed within this common frame of reference and displayed on a display device 84.

In the above-discussed embodiment, where the deployment recognition device 28 includes a positioning system 34, such as a GPS, the deployment recognition device 28 can set its origin or subsequent position as or with relation to the GPS position. The user U, in turn, can then be associated with that position taking into account the offset between the user U and the location of the positioning system 34 within the deployment recognition device 28. Again, this offset can be mathematically determined or otherwise assumed. However, it is recognized that a GPS signal cannot always be obtained in certain environments, such as certain outdoor environments and locations, and is normally not obtainable or reliably obtained in an indoor environment. Therefore, the position of the deployment recognition device 28 can alternatively be set through communication with the user U, where the navigation data 18 generated by the user U is through the use of navigation data 18 derived from the isolated (e.g., dead reckoning-based) personal inertial navigation module 12.

In normal situations, multiple users U are navigating in a particular environment that is under control of one or more control users using the central controller 32 (or multiple central controllers 32 or remote computers). In certain GPS-denied areas or environments, the personal inertial navigation modules 12 of one or more of the users can be used in setting the position of the deployment recognition device 28 (again, taking into account offset, as well as error and drift), and this position can then be used in locating other users U that come into contact or communication with this same deployment recognition device 28.

Generally, however, whether through the use of a positioning system 34 or the personal inertial navigation module 12 of one or more of the users U, the primary goal is to ensure that all users U, features, items, objects, and the like are accurately placed in the common frame of reference for display on the display device 84. Also, as discussed above, it is envisioned that the deployment recognition device 28 includes its own inertial-based navigation system 36 that is not reliant on receiving external signals for position. Still further, both a GPS (or the like) positioning system 34 and an inertial navigation system 36 can be used and integrated into the deployment recognition device 28, thereby providing it with the ability of both GPS-based positioning and dead-reckoning positioning functionality, dependent upon the environment. In such an embodiment, the deployment recognition device 28 could be programmed or configured to recognize and/or sense its specific environment, and choose whether the positioning system 34 or the inertial navigation system 36 should be used. For example, a loss of or deterioration of external signals to the positioning system 34 may trigger the deployment recognition device 28 to switch to the user of the inertial-based navigation system 36.

As further illustrated in FIG. 2, and in another preferred and non-limiting embodiment, a data device 38 is associated with the user U and programmed or configured with user data, time data, event data, and/or navigation data 18. For example, this data device 38 may be in the form of a radio frequency identification (RFID) device or tag, whether passive or active, which is configured to directly or indirectly provide information and data, such as all or a portion of the user data, time data, event data, and/or navigation data 18, to the deployment recognition device 28 (and/or the central controller 32).

As seen in FIG. 2, and in this preferred and non-limiting embodiment, the deployment recognition device 28 includes a reader 40 that activates and/or reads the data stored on and/or generated by the data device 38. In the example where this data device 38 is in the form of an RFID tag, the reader 40 is a radio frequency identification reader capable of communicating with and interacting with the tag, where this communication may be uni-directional, bi-directional, or in any other suitable data or signal communication form or format. This allows the user U to "tag-in" at the deployment recognition device 28 and to be recognized in the common frame of reference, as discussed above.

The operation or function of "tagging in" or a "tag-in" event refer to the direct or indirect communication of data between some component worn by or associated with the user U and the deployment recognition device 28 (and/or central controller 32). The "tag-in" event can occur between any appropriate data emitting device (e.g., the data device 38, data device 76 (as discussed hereinafter), communication device 44, e.g., radio 46, (as discussed hereinafter), the personal inertial navigation module 12 of the user U, or any data-containing element) and a data receiving device, such as the reader 40 of the deployment recognition device 28. Therefore, this interaction or event can occur by and through any effective data transfer arrangement event or arrangement, such as the "tag-in" event and/or the "pairing" event, both of which are discussed in detail hereinafter.

As discussed above, the position of the user U in the common frame of reference can be set and subsequently adjusted to be at least partially based on the position of the deployment recognition device 28 in the common frame of reference. In one preferred and non-limiting embodiment, the deployment recognition device 28 is transportable between a first position and at least one subsequent position. Accordingly, the first position and/or the subsequent position in the common frame of reference can be determined or set based at least partially on the navigation data 18 of the personal inertial navigation module 12 of the user U, or alternatively, data obtained through the positioning system 34.

Figure 3:
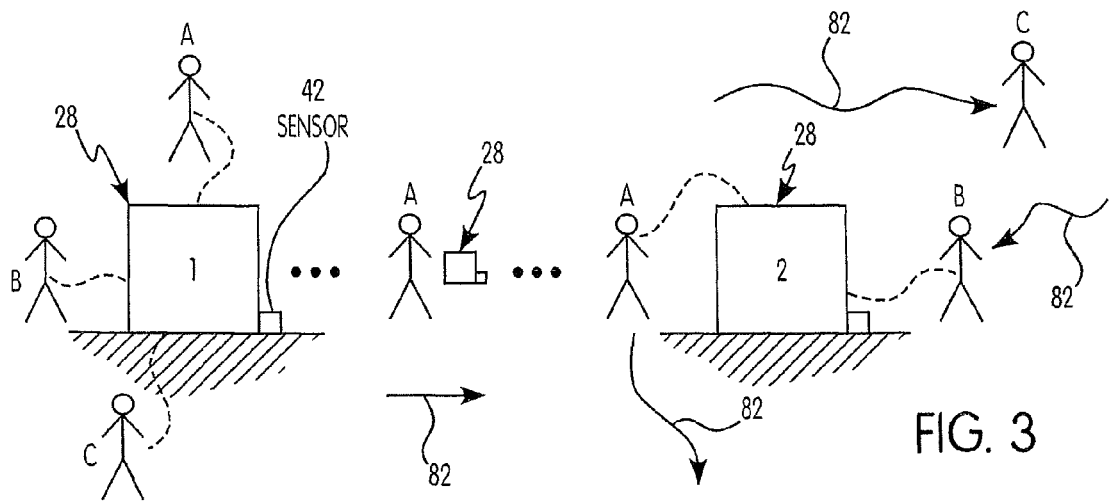
FIG. 3 is a schematic view of one implementation of a navigational deployment and initialization system according to the principles of the present invention.

One such exemplary embodiment is illustrated in FIG. 3, where users A, B, and C are navigating in the same environment. Each of these users A, B, and C, tag in with the deployment recognition device 28 using their respective data devices 38 or, alternatively, the data device 76. At this point, the position of each of the users A, B, and C are set to the position of the deployment recognition device 28 in the common frame of reference. As discussed, the position of the deployment recognition device 28 may have been previously set or determined based upon information from the central controller 32, the positioning system 34 of the deployment recognition device 28, a separate or standalone positioning system, the inertial navigation system 36 of the deployment recognition device 28, and/or some direct or indirect interaction with the personal inertial navigation module 12 of one or more of the users U. Furthermore, in this embodiment, at least one sensor 42 is affixed to or integrated with the deployment recognition device 28.

In this implementation, the position of the deployment recognition device 28, which is referred to as a position "1" in FIG. 3, serves as either the point of origin or some initial or subsequent point within the common frame of reference. In this example, user A picks up the deployment recognition device 28 to move it to another location in the environment. At this point, the sensor 42 senses this movement or interaction and "assumes" that its new position is unknown. User A then moves it to a subsequent position, referred to as position "2" in FIG. 3, and sets the deployment recognition device 28 back down on the ground. Again, the sensor 42 understands that it is now ready to be initialized or its position otherwise set in the common frame of reference.

In this embodiment, it is assumed that position "2" is in a GPS-denied area. Accordingly, a further communication and/or interaction between the user A and the deployment recognition device 28 occurs in order for the deployment recognition device 28 to set its position to the new position of user A in the common frame of reference. This position is set based at least partially upon the navigation data 18 provided by the personal inertial navigation module 12 of user A. Thereafter, user B approaches deployment recognition device 28 and tags in or otherwise interacts with the deployment recognition device 28, and the position of user B is then set (including offset and any drift determinations made based upon user A) to the new position "2" of the deployment recognition device 28. Accordingly, all of users A, B, and C continue to navigate in the common frame of reference, with user A and user B navigating based upon the subsequent position "2" of the deployment recognition device 28 (and their interaction therewith) and user C with the previous position "1" of the deployment recognition device 28, which represents the last event associating him or her within the common frame of reference.

Figure 4:
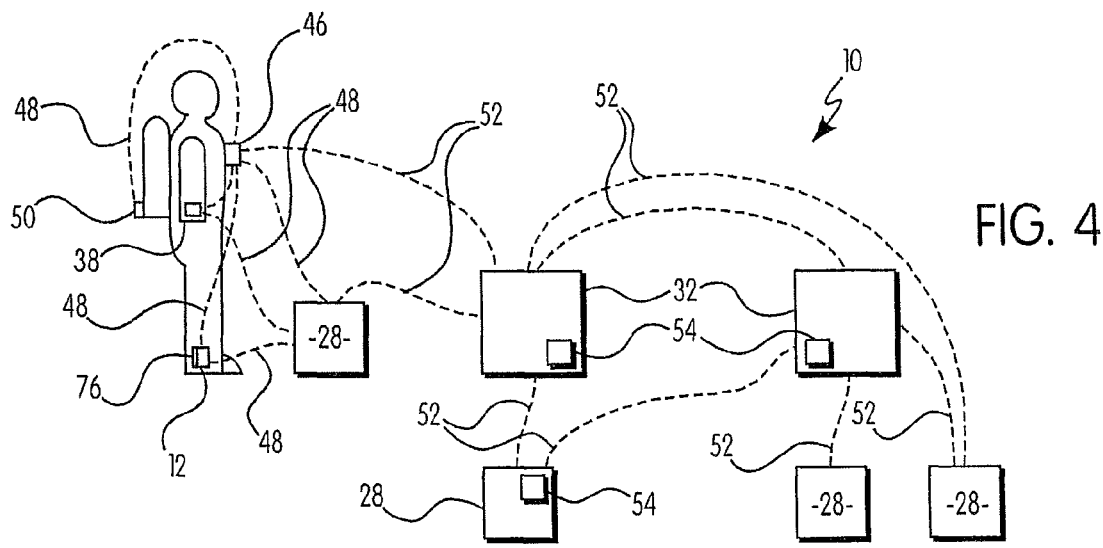
FIG. 4 is a schematic view of a further embodiment of a navigational deployment and initialization system according to the principles of the present invention.

With reference to FIG. 4, and as discussed above, in one preferred and non-limiting embodiment, the system 10 also includes at least one communication device 44 that is associated with the user U and programmed or configured for direct or indirect communication with the personal inertial navigation module 12, the deployment recognition device 28, the central controller 32, the data device 38, the data device 76, the reader 40, or any of the other components in the system 10. In one preferred and non-limiting embodiment, the communication device 44 is in the form of a radio 46 that is capable of both short-range and long-range communication. Accordingly, as illustrated in FIG. 4, the radio 46 uses short-range communication 48 to communicate with, for example, the personal inertial navigation module 12, the data device 38, as well as a self-contained breathing apparatus (SCBA) device 50. However, the short-range communication 48 link between the radio 46 is not limited only to these components, and can be used in connection with any communication-enabled components within its range and/or on its network. As discussed, the radio 46 is also enabled for long-range communication 52, such as with one or more central controllers 32, one or more deployment recognition devices 28, or other long-range-enabled devices or equipment.

With continued reference to FIG. 4, at least one database 54 is set or generated for use in managing the various data streams within the system 10. Accordingly, the at least one database 54 can be populated with user data, time data, event data, navigation data 18, common frame of reference data, position data, personal inertial navigation module data, deployment recognition device data, central controller data, communication device data, and the like. In the example of FIG. 4, this database 54 is located on both central controllers 32, as well as one of the deployment recognition devices 28. Of course, the database 54 can be placed on or used in connection with any of the various controllers discussed above for use in ensuring accuracy and data integrity. Accordingly, the at least one database 54 can be dynamically updated between the various units and devices, and the data transmitted, received, and populated in the database 54 can be synchronized using the accompanying time data, such as time data derived from one or more of the GPS components of the system 10.

It should be further recognized that the deployment recognition device 28 can also be referred to as a "base station," which is in communication with the central controller 32. Therefore, regardless of whether the deployment recognition device 28 is permanently fixed to the vehicle V, removable from the vehicle V, or otherwise transportable, it can represent a base station with which the user U can interact, such as through the reader 40 component of the device 28. Furthermore, the deployment recognition device 28 should be considered a system with interacting and communicating components (as, for example, controlled by the controller 30) that are dispersed over a variety of platforms or structures (e.g., the vehicle V) or consolidated into a single housing (e.g., the transportable device 28).

Figure 5:
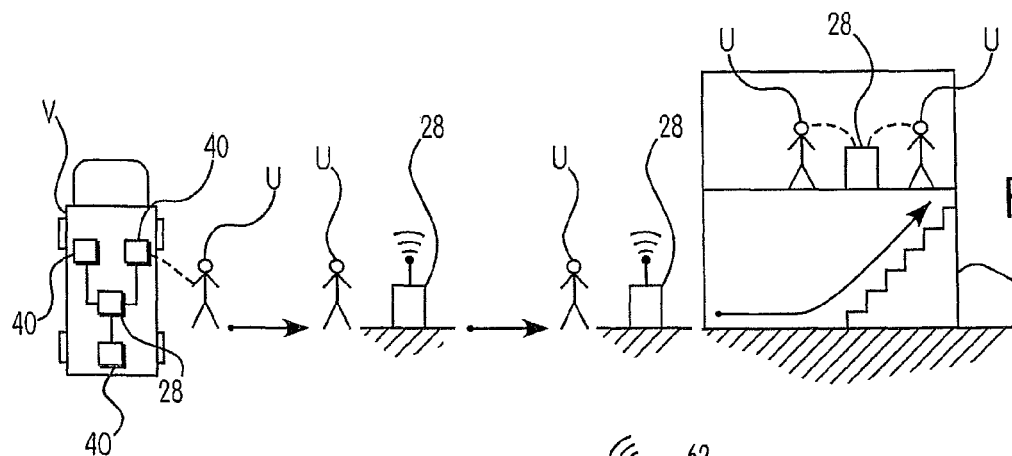
FIG. 5 is a schematic view of another implementation of a navigational deployment and initialization system according to the principles of the present invention.

In another preferred and non-limiting embodiment, and as illustrated in schematic form in FIG. 5, the deployment recognition device 28 can be located on or in connection with a vehicle V, such as a firefighting vehicle. In one embodiment, the deployment recognition device 28 is permanently affixed to a portion of the vehicle V in a specified position. As such, the position of the deployment recognition device 28, and/or the reader 40, is set or determined with respect to, for example, the GPS antenna or other known position on the vehicle V. Again, taking into account offsets, the position of the user U in the common frame of reference is set at the "tag-in" event or other interaction with the reader 40 and/or deployment recognition device 28, and this common frame of reference is based upon a global frame of reference established through the use of a GPS-enabled positioning system.

In another preferred and non-limiting embodiment, and with continued reference to FIG. 5, the deployment recognition device 28 can be removed from the vehicle V and moved to some other location in the environment. Accordingly, and it is envisioned that the deployment recognition device 28 would act as discussed above in connection with the transportable deployment recognition device 28. As seen in FIG. 5, the deployment recognition device 28 includes an internal positioning system 34 that continually obtains a GPS signal, upon which to base its own position, as well as the position of any user U that tags in or otherwise interacts with the deployment recognition device 28. However, once this deployment recognition device 28 is moved into an indoor location, such as on the second floor of a structure, and if the GPS signal is lost, the deployment recognition device 28 determines or sets its position based upon one or more of the users U that subsequently interacts therewith (or, alternatively, based upon its internal inertial navigation system 36). Then, again as discussed, each subsequent user U will be effectively placed in the common frame of reference through additional interactions with the deployment recognition device 28.

Accordingly, the present invention provides a system 10 for accurately and effectively placing one or more users U, features, items, objects, and the like in a common frame of reference using one or more deployment recognition devices 28. Further, the present invention is directed to a computer-implemented method of determining a position of the deployment recognition device 28 in the common frame of reference in which multiple users U are navigating. In particular, the deployment recognition device 28 receives at least a portion of the navigation data 18 directly or indirectly from the personal inertial navigation module 12 of a user U. The deployment recognition device 28 then determines or sets a position in the common frame of reference based at least in part upon at least a portion of the navigation data 18 of the user U. This position may be an initial position or point of origin, a subsequent position, or any position in the environment represented by the common frame of reference.

In this preferred and non-limiting embodiment, the deployment recognition device 28 enters an initialization mode, where a position of the deployment recognition device is not set. Next, the deployment recognition device 28 receives at least a portion of navigation data 18 of the user U sufficient to determine a user U position. Next, the deployment recognition device 28 determines its own position in the common frame of reference based at least in part upon at least a portion of this navigation data 18, and once completed, enters a ready mode, where the position of the deployment recognition device 28 is set.

When the deployment recognition device 28 is transportable, and during the act of transportation, the deployment recognition device 28 senses (such as through the use of the sensor 42) movement from its position. Upon such sensing, the deployment recognition device 28 again enters the initialization mode. Thereafter, the deployment recognition device 28 either re-sets its position to that of the internal positioning system 34 or based upon the position of the first known user U that effectively interacts with the deployment recognition device 28. Afterward, all users U that interact with the deployment recognition device 28 are set to its position, thus ensuring continued navigation and tracking of all user U in the common frame of reference.

Figure 6:
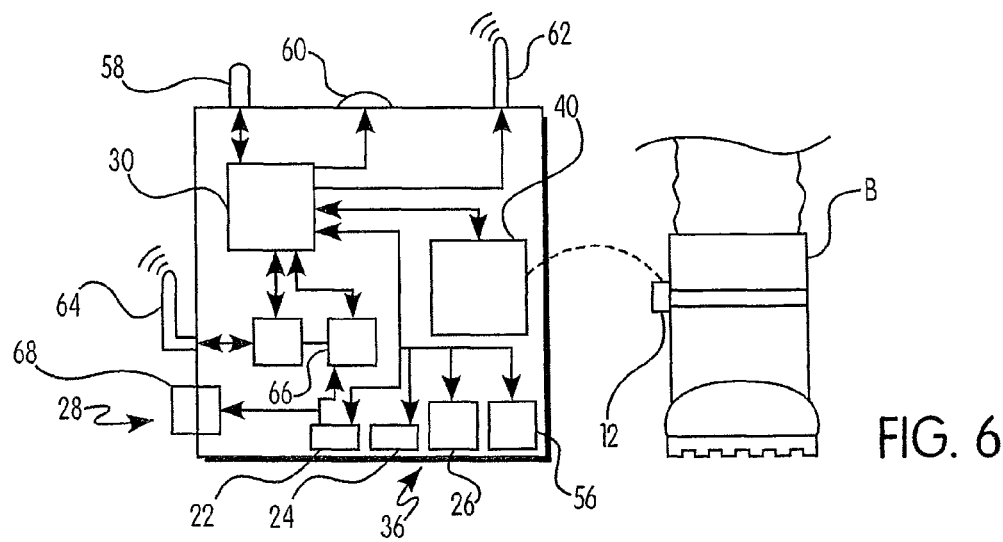
FIG. 6 is a schematic view of portions of another embodiment of a navigational deployment and initialization system according to the principles of the present invention.

In another preferred and non-limiting embodiment, and as illustrated in schematic form in FIG. 6, the deployment recognition device 28 may take various forms and structures. The embodiment of FIG. 6 represents one preferred and non-limiting embodiment of the transportable deployment recognition device 28. In this embodiment, the controller 30 is capable of GPS-pseudorange measurements utilizing the Standard Positioning Service (SPS), which facilitate the establishment of the deployment recognition device 28 in a common frame of reference, in this case the global (WGS84) frame of reference $(\phi,\lambda,h)_s$. The reader 40, which, in this embodiment is a tag-in device, has the global position of $(\phi,\lambda,h)_b$, which is set to the equivalent of the position of the deployment recognition device 28. This minimizes or eliminates measurement error, labor, and the infrastructure costs of establishing and installing the GPS antenna in known reference positions to each reader 40 (such as in the above-discussed vehicle-based fixed implementation). In addition, such an arrangement eliminates and reduces complexity in maintaining unique position measurements for each reader 40 and/or deployment recognition device 28 as used in the vehicle-based system at least partially illustrated in FIG. 5.

In particular, when using the vehicle-based arrangement, estimating a position and orientation of the vehicle V is subject to the standard deviation error of the GPS-pseudorange measurement, which may limit its ability to estimate an accurate azimuth. Such errors are further compounded due to physical obstructions surrounding the vehicle V, which may also limit the GNSS data. The use of the transportable deployment recognition device 28 of this particular embodiment can mitigate or reduce such error through its deployment flexibility and use of additional sensors. Specifically, these sensors can include one or more accelerometers 22, gyroscopes 24, magnetometers 26, and/or pressure sensors 56. Accordingly, in this embodiment, the deployment recognition device 28 includes the above-discussed inertial navigation system 36 as at least one of its positioning systems 34. By using the information from these sensors, the controller 30 can be programmed or configured to estimate an orientation for use in the initialization process of the system. The deployment recognition device 28 position estimate, for example, can be expressed in ECEF coordinates: $r_{z/g}^{e}=R_{t}^{e}R_{b}^{t}(r_{z/g}^{b})$, where $r_{z/g}^{e}$ is the GPS location estimate with respect to an arbitrary origin z in the ECEF frame. With some experience, an accurate initial orientation estimate of the deployment recognition device 28 is possible by placing it in a benign location, where magnetic field data is not corrupted by hard and/or soft iron biases.

With continued reference to the embodiment of FIG. 6, once the controller 30 acknowledges an effective "tag-in" event or interaction between a component worn by or associated with the user U and the reader 40, a beacon 58 turns on. The deployment recognition device 28 further includes a GPS antenna 60 for use in the positioning system 34 component of the deployment recognition device 28. A 900 Mhz antenna 62 is provided for use in communicating with a communication device 44, such as a radio 46 of the user U. A WiFi antenna 64 is used for communicating with various components in the system 10, such as the central controller 32. Finally, in this embodiment, an internal battery 66 is included to power the internal components, and this battery 66 is in electrical communication with an external power port 68 (for charging the battery 66 or otherwise energizing one or more of the components of the deployment recognition device 18).

One of the benefits of using one or more transportable deployment recognition devices 28 (as opposed to a vehicle-mounted system) is based upon certain potential drawbacks associated with a line-of-sight wireless system in connection with a first responder's communication architecture. In particular, if the path between the deployment recognition device 28 (or "base station") and the user U is in a poor radio frequency location, there may be no opportunity to maximize the strength of the received signal. A transportable deployment recognition device 28 at least partially overcomes this limitation by deploying in a manner with flexibility to maximize the strength of the received signal. Specifically, the line-of-sight on-scene complexities often require that the system 10 have the ability and flexibility to minimize the out-of-phase signal effects, which occur when field obstructions occur. Field obstructions, including firefighting apparatus (i.e., vehicle V), extended ladders, buildings, dumpsters, statues, etc. represent such obstacles. The use of the transportable deployment recognition device 28 eliminates these obstructions from the radio frequency line-of-sight, such as, for example, deploying the deployment recognition device 28 to an elevated location, or to a lower height, depending upon the radio frequency signal reflections.

However, with a fixed system that includes a non-transportable deployment recognition device 28 fixedly mounted on a vehicle V, some practical and radio frequency challenges may limit the user's U initialization procedure due to uncontrollable obstructions present at the first responder scene. Further, having the readers 40 (as part of the deployment recognition device 28 or "base station" system) permanently installed at various locations on the vehicle V may create congestion points and confusion for the first responder. Typically, each firefighter (user U) has a unique job associated with the vehicle V or on scene. First responders have assigned duties, which ensure each individual does not impede each other's work space during the emergency. Accordingly, forcing, for example, the ladder crew to "tag-in" at the engine apparatus (vehicle V) may be to restrictive to their workflow procedures. Accordingly, the use of the transportable deployment recognition device 28, such as the deployment recognition device 28 shown in FIG. 6, allows for the optimization of the radio frequency throughput signal and user workflow.

With a view to optimization, it is well known that the strongest signals are on the direct line between the transmitter and receiver portions of the system 10, and always lie in the first Fresnel zone. The radius of the first Fresnel zone can be calculated by estimating the distance between the transmit and receive antenna and the frequency of the transmitted signal via the following equation: $r=8.657*\sqrt{(D)/f}$, where D is the distance in kilometers and f is the transmit frequency in Ghz. Obstacles, e.g., firefighting vehicle V, extended ladders, buildings, dumpsters, statues, etc. which lie within the Fresnel radius, will degrade the signal-to-noise transmission with the possibility for inadequate signal-to-noise to use the system. For this reason, the transportable deployment recognition device 28 can be deployed with flexibility, thus mitigating poor radio frequency pathing with an optimal (ideal) "tag-in" location, i.e., reader 40 of the deployment recognition device 28.

The "tag-in" process or event in one preferred and non-limiting embodiment is an in-line (e.g., ankle height) process with the personal inertial navigation module 12, such as the data device 76, or some other component of the module 12. The user U places his or her boot B in close proximity to the deployment recognition device 28 to initiate the navigation "tag-in" procedure. Upon "tag-in," the deployment recognition device 28 illuminates the beacon 58 (e.g., turns it to green) momentarily to acknowledge that the navigation module status flag and navigation algorithm initialization acceptance has occurred. When the deployment recognition device 28 accepts a user "tag-in", the device 28 becomes a local origin about which navigation originates, as discussed above in detail. It is well known and understood that the personal inertial navigation module 12, and specifically the sensors 14 therein, drift as a function of time. A constant gyroscope bias error $b_g$, for example, when integrated, causes an angular error that grows linearly with time: $\theta(t)=b_g*t$. Similarly, a constant accelerometer bias error $b_a$, when double integrating, causes an error in position that grows quadratically with time: $r(t)=b_a*t^2/2$. As a result, these errors need to be managed in the deployment of the navigation system to ensure location accuracy is maintained and drift errors minimized over long periods of time. In one embodiment, the deployment technique includes optimizing the time of the "tag-in" event based upon the user application and scene complexity.

In one scenario, the vehicle V is located at the base of a hill some distance from the structure S. Upon exiting the vehicle V, the user U may traverse hundreds of feet for many minutes. During this time, the sensors 14 of the personal inertial navigation module 12 of the user U will accumulate horizontal and vertical drift errors. In addition, the users U traversing elevated grades on unstable surfaces can limit the system's position accuracy, thus causing additional vertical error prior to entering the structure S, where navigation accuracy is essential. By locating the deployment recognition device 28 at the entry of the structure S, for example, "location" begins (i.e., start of location tracking and relative origin) when the user U "tags-in" to the deployment recognition device 28 by placing his or her foot (boot B) in the proximity of the reader 40. This deployment approach eliminates the incident commander's interpretation and potential confusion resulting from vertical and horizontal track errors accumulating during the non-essential times of the event.

In another scenario, the deployment recognition device 28 is deployed on a higher floor, e.g., the $40^{th}$ floor, of a 60-floor high rise building. This is a common deployment technique in certain areas of the world, e.g., Asian countries, where the firefighter's incident command is set up within the structure S, itself. In this preferred and non-limiting embodiment, the deployment recognition device 28 is a transportable deployment recognition device 28 that allows such a deployment scenario, whereby the origin of navigation is flexible and can be ideally located on the user's U application. Furthermore, the device 28 enables the user to begin location tracking during times essential to the navigation mission. Another deployment benefit of the transportable deployment recognition device 28 is its ability to maintain good radio frequency communications to the user's U communication devices 44, e.g., the radio 46. Accordingly, the device 28 can be configured as a repeater to improve radio frequency transmissions in building structures, where radio frequency obstructions are ubiquitous. The use of the deployment recognition device 28 as a repeater is useful in connection with relaying navigation data and other data to a different device 28 and/or the central controller 32. In addition, the deployment recognition device 28 is configured for radio frequency communications that can be extended by using an external port interface for a Motorola Canopy antenna and/or a 3G modem interface. Accordingly, the use of a transportable deployment recognition device 28 exhibits certain benefits within the context of the entire system 10.

As discussed above, regardless of the placement of the deployment recognition device 28, one of the primary benefits of the presently-invented system 10 is the user-friendly single-point initialization and navigation process for deploying multiple users U in the navigation environment, and in a common frame of reference. As discussed above, when using a multi-point initialization approach, such as the use of multiple mats or other devices, the technique is sensitive to the detection radius of each mat or marker. Small errors in the marker detection cause an azimuth error, which translates to a horizontal error proportional to the distance from the origin. This error can be significant, whereas in a single-point initialization approach, an error in the marker detection translates to an equivalent horizontal error. This error does not grow with distance. Accordingly, the use of the deployment recognition device 28 and associated components and processes according to the presently-invented method and system 10 lead to a more efficient user U application and experience.

For example, and as discussed above, the deployment recognition devices 28 can be connected to or integrated with a vehicle V. For example, multiple readers 40 can be positioned around the perimeter of the vehicle V, and the deployment recognition device 28 (acting as a "base station") can be integrated with the existing GPS system or receiver of the vehicle V. The reader 40 can be placed in a convenient location in the vehicle V, such as near a door or tool cabinet. Multiple readers 40 are possible, and these readers 40 represent a location "tag-in" point in the form of a radio frequency identification reader with wired connectivity to the deployment recognition device 28 (or system), acting as a "base station" on the vehicle V, or to a corresponding base station system already present on the vehicle V.

In this preferred and non-limiting embodiment, each user U has a data transferring device, such as data device 38, data device 76, a unique radio frequency identification tag, or the like, positioned on a convenient location on his or her body. The specific location does not need to be known. To tag in to the location network, i.e., the system 10 network, the user U brings his or her data transfer device into close proximity to the reader 40. The reader 40, which scans continuously in this embodiment, detects the data transfer device, and then notifies or otherwise logs the event in the deployment recognition device 28. The deployment recognition device 28 stores the "tag-in" event information, then replies with the associated user's U personal inertial navigation module 12 status. If the user U exists on the network, and the module 12 has a valid status, the reader 40 provides visual and/or audio confirmation to the user U that he or she is in the location system. For example, the beacon 58 discussed above can be utilized to provide this confirmation to the user U, such as a firefighter or the like. This indication, whether audio and/or visual, indicates to the user U that the location system is functioning properly.

One deployment method and technique according to the principles of the present invention is illustrated in FIGS. 7(a)-(f). In particular, as shown in FIG. 7(a) the user U obtains two batteries 70, 72, inserts battery 70 into the radio 46, and inserts battery 72 into the personal inertial navigation module 12. Next, according to FIG. 7(b), the user U holds the radio 46 in close proximity to the user's U boot B, i.e., the personal inertial navigation module 12, and presses a "pair" button 74 on the radio 46. As shown in FIG. 7(c), the radio 46 scans for nearby data devices 76, and the radio 46 identifies the data device 76 of the inertial navigation module 12. After identification, the radio 46 obtains certain data points from the data device 76, including, but not limited to, the boot module's vendor identification, product identification, serial number, and radio capabilities. In addition, the radio 46 recognizes a compatible device, i.e., the inertial navigation module 12, and contacts the module 12 via Bluetooth® using the information and data from the data device 76 as the personal inertial navigation module 12 network name and key. As shown in FIG. 7(d) and upon successful pairing (or failure), the radio 46 notifies the user U via audio and/or visual indicators, such as a light emitting diode (LED) 78.

Next, the user U holds the radio 46 in close proximity to the data device 38, which may be mounted on the turn-on gear near the person's hand, and again pushes the "pair" button 74 on the radio 46. The radio 46 again scans for nearby data devices, and identifies the data device 38 and reads its contents. In this embodiment, the data on the data device 38 includes, but is not limited to, vendor identification, product identification, serial number, and radio capabilities. As above, and with reference to FIG. 7(f), the radio 46 recognizes the user's personal issued tag (data device 38), and notifies the user U that the radio 46 is ready for use. Accordingly, FIG. 7 represents the shift preparation procedure that occurs prior to transportation to the event or emergency environment.

FIGS. 8(a)-(e) illustrate a further scenario where the deployment recognition device 28 is removably attached to, fixed to, or otherwise integrated with the vehicle V (or some of the vehicle V systems). In particular, and with reference to FIG. 8(a), the deployment recognition device 28, either alone or as integrated with the system of the vehicle V, estimates the location and orientation of the vehicle V continuously or regularly during transport to the scene. In doing so, the deployment recognition device 28 uses its positioning system 34 and/or the positioning system of the vehicle V, as well as the pressure sensor 56 and optionally the inertial navigation system 36. As illustrated in FIG. 8(b), and in the normal situation, each vehicle V parks in a different location and orientation. The deployment recognition device 28 maintains location and orientation estimates for its respective vehicle V.

Next, the users U (e.g., the firefighters) exit the vehicle V and walk towards tool cabinets, pumps, or other common locations on the vehicle V. At this point, and as shown in FIG. 8(c), the user U waves their data device 38 near the reader 40 of the deployment recognition device 28. The reader 40 detects and reads the contents of the data device 38 for each user U. The deployment recognition device 28 and/or some other component of the system 10 determines whether the user U exists on the current location network, and the deployment recognition device 28 and/or the central controller 32 replies indicating that the user U does exist in the location network. At this point, the reader 40 notifies the user U via audio and/or visual confirmation that he or she exists in the location network, such as through the use of the beacon 58. See FIG. 8(d).

After one or more "tag-in" events, the deployment recognition device 28 (as separate from or integrated with the system of the vehicle V) notifies other deployment recognition devices 28 and/or vehicles V of the "tag-in" event. As discussed above, and as illustrated in FIG. 8(e), the deployment recognition devices 28 (or "base stations") are in communication with each other, and can maintain the above-discussed common database 54 of user U location status and other information. Similarly, the deployment recognition devices 28 correlate "tag-in" event information (e.g., time stamp, firefighter identification, tag-in module location, apparatus, department, company, team, etc.) with location data. As discussed, the orientation and position of the reader 40 with respect to the deployment recognition device 28 or some other known point, e.g., the GPS antenna on the vehicle V, are correlated, and an offset is computed between the location of the personal inertial navigation module 12 and the reader 40 geodetic location. Accordingly, this represents one preferred deployment procedure whereby users U are provided entry into the system network using their data devices 38. Again, this procedure can be used in an environment where the deployment recognition device 28 is permanently or removably fixed to the vehicle, or in the form of a transportable device 28.

As discussed above, and in one preferred and non-limiting embodiment, when the deployment recognition device 28 is used in connection with or otherwise integrated with the vehicle V, the "deployment recognition device" refers to the integrated and functional system resulting from this association. Accordingly, and in preferred and non-limiting embodiment, the term "base station" or "system" refer to the deployment recognition device 28 as part of the vehicle V, which can use multiple readers 40 positioned around the vehicle V. Further, and as previously discussed, one or more of the systems or subsystems of the deployment recognition device 28 and/or readers 40 can be integrated with or into the systems and subsystems of the vehicle V, such as the existing GPS arrangement of the vehicle V. Still further, in such an embodiment, the positioning of the various readers 40 with respect to the GPS of the deployment recognition device 28 and/or vehicle V is predetermined, and other orientation and position data is determined using the various sensors provided as part of the deployment recognition device 28 (or system 10). Accordingly, the present invention should not be limited to any particular or required arrangement on the vehicle V when used in connection with the integrated vehicle V/device 28 system.

Another preferred and non-limiting embodiment of the system 10 of the present invention is illustrated in FIG. 9. Specifically, FIG. 9 demonstrates the various communication platforms and architectures that can be used for facilitating data transmission and receipt between the components and users U of the system 10. For example, communication between the users U, such as through the user of the radio 46, can include long-range communication 52 to the deployment recognition device 28 (whether on the vehicle V or in transportable form), to the central controller 32 (e.g., the portable, remote computer of the incident commander), as well as to other user's U radios 46. Similarly, long-range communication 52 can occur between deployment recognition devices 28, as well as between multiple deployment recognition devices 28 and/or the central controller 32.

In this embodiment, it is envisioned that short-range communications 48 are used between the accessories or components worn by or associated with the user U, e.g., the personal inertial navigation module 12, the data device 38, the SCBA device 50, the data device 76, and the radio 46. Similarly, short-range communications 48 are preferably used for the "tag-in" event between the user U and the reader 40 of the deployment recognition device 28. Finally, as illustrated in FIG. 9, each deployment recognition device 28, in this preferred and non-limiting embodiment, is GPS-enabled, such that each deployment recognition device 28 is configured to receive GPS signals 80. Any appropriate means of communication facilitating appropriate data transfer between the various components of the system 10 is envisioned, such as WiFi communication, Ethernet communication, long-range radio communication, Bluetooth® communication, hard-wired communication, radio frequency communication, and the like.

Figure 10:
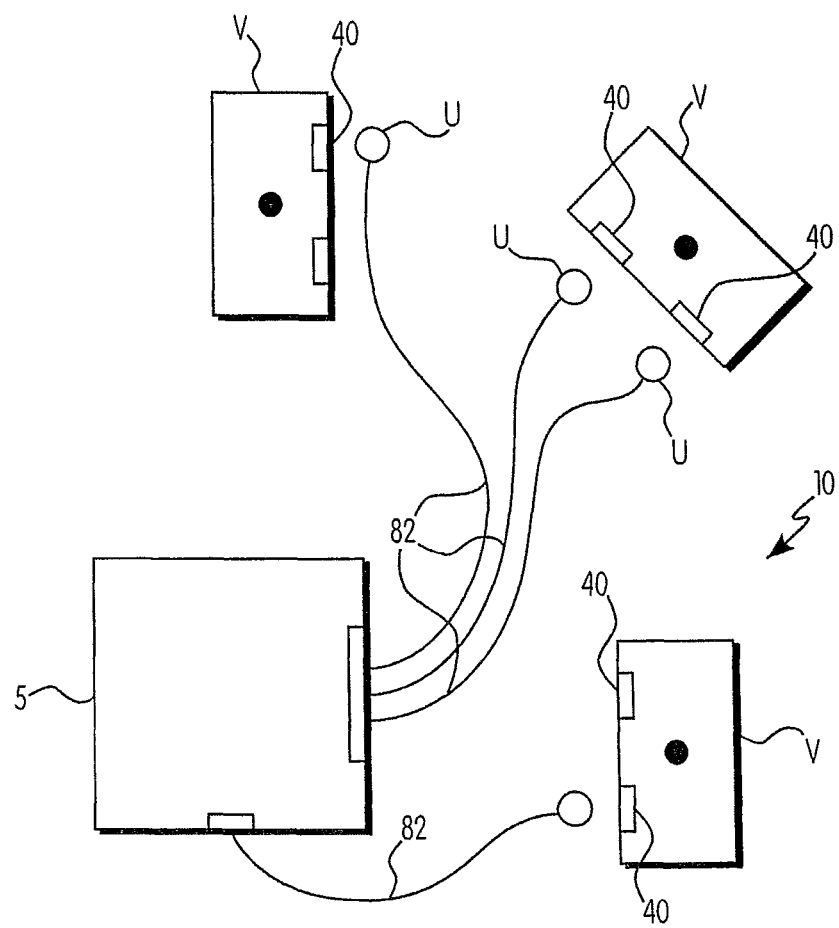
FIG. 10 is a schematic view of a sill further embodiment of a navigational deployment and initialization system according to the principles of the present invention.

In a still further preferred and non-limiting embodiment of the present invention, and as illustrated in FIG. 10, users U can tag in or otherwise interact with the readers 40 at any of the vehicles V prior to the navigation process and entering the structure S. Again, and as discussed above, the position of each reader 40 is predetermined based upon the orientation and position of the vehicle V and the position of the GPS antenna on the vehicle V. Similarly, the physical offset between the reader 40 and the user U, i.e., the personal inertial navigation module 12 of the user U, can be either dynamically determined or assumed in the common frame of reference. In this embodiment, the GPS antenna 60 of the deployment recognition device 28 is in the form of the GPS antenna of the vehicle V (which already exists on most vehicles V). Accordingly, and as discussed, the relative position of the readers 40 on the vehicle V with respect to the antenna 60 is determined prior to transportation to the event or scene. At that point, the new orientation and position information of the vehicle V is used in determining the origin information for each reader 40, which is translated to the origin information of each user U (including some offset amount). Accordingly, FIG. 10 represents the effective use of vehicle-based deployment recognition devices 28.

Some of the benefits that stem from using a vehicle-based system is that the location and orientation of the vehicle V can be used to relate the position of all readers 40 in a common frame of reference, which, in this case, is the global coordinate system. All vehicles V and users U would then be on a common coordinate system, thus facilitating multi-entry. Next, the vehicle V represents a "home base" for each user U team. The team is familiar with its location on the scene, and firefighters frequent their specific vehicle V to obtain tools, ladders, and hoses. Each time a firefighter (user U) returns to the vehicle V, he or she could again tag in or interact with the reader 40 to ensure location accuracy, or to make adjustments to minimize or eliminate accumulated drift and/or bias. Relating users U to a specific vehicle V also provides important feedback to incident command. Still further, the vehicle V provides shore power, and the reader 40 can continuously scan for data devices 38, support audio and visual indicators (e.g., beacons 58), and communicate location information by and between multiple deployment recognition devices 28 within the system 10. In addition, firefighters do not need to deploy additional equipment at the location during an emergency situation.

In another preferred method and implementation of the presently-claimed invention and system 10, the reader 40 scans and identifies the user's U data device 38. The reader 40 notifies the deployment recognition device 28 (or some component thereof), such as over a controller area network (CAN) bus. The device 28 receives the message and stores the "tag-in" information in the database 54, including, for example, time stamp information, reader 40 information, vehicle V information, department, company, team, etc. The deployment recognition device 28 then notifies other deployment recognition devices 28, such as on other vehicles V, using long-range communication 52 regarding the "tag-in" event. All of the various deployment recognition devices 28 then store and maintain the information in their updated databases 54. Next, a determination is made of whether the user U is associated with this particular deployment recognition device 28 (or "base station"). If not, the deployment recognition device 28 does nothing further; but, if the user U is on this particular deployment recognition device 28, an acknowledgment is transmitted to the user's U personal inertial navigation module 12 (via long-range communication 52) in a broadcast message.

Also after the "tag-in" event, the deployment recognition device 28 queries whether the user's U data device 38 exists in the long-range radio network database (which is also a database 54 in accordance with the present invention), which is shared amongst all of the various deployment recognition devices 28. If the data device 38 exists in the long-range radio network database 54, the user's U initialization flag is checked and either set with a reply to the reader 40 of a positive acknowledgment (which is indicated to the user U via the green beacon 58 and an audio acknowledgment), or the initialization flag is cleared. When cleared, a four-second wait time is used to have the flag set. If successful, a positive acknowledgment is sent to the reader 40; and, if this fails, a negative acknowledgment is sent, such as a red beacon 58 and/or audio indication. In a further preferred and non-limiting embodiment, when each vehicle V includes a deployment recognition device 28 (or system) the resulting network facilitates effective location.

In one preferred and non-limiting embodiment where each deployment recognition device 28 can communicate with one another over two time slots per connection: one time slot transmits, while the other time slot receives. For each cycle, the device 28 has an opportunity to transmit and receive information, and the network topology can be in any desired form, such as a mesh or linked star network. As discussed above, all devices 28 and other components of the system 10 on the location network synchronize their internal clock to the GPS PPS time reference. This synchronization may occur directly from the GPS signal 80, such as at the deployment recognition device 28, or indirectly via a radio link, such as with the radio 46 and personal inertial navigation module 12. A common time reference permits time stamps and synchronization of information between different components. When an event occurs, such as when a user U tags in into the location network, or when a user U joins a long-range radio network, the deployment recognition devices 28 communicates this information, such that all devices 28 maintain a common database 54. Time synchronization permits a version control of database 54 entries, and new devices 28 that join the network download the latest database 54 after joining. Given sufficient time during or after the event, all deployment recognition devices 28 have an identical database 54, as does the central controller 32.

In one preferred and non-limiting embodiment, location includes certain primary database 54 entries. These entries include, without limitation, data device 38 information and inertial navigation module 12 initialization status. The data device 38 information updates when a user U tags into the location network; and again, the associated event information can include time stamp information, location of the reader 40, apparatus identification, department, company, team, and the like. The database 54 maintains a list of all events for each user U, and incident command can use this information to understand where each user U or a group of users U originate, with respect to an specific vehicle V and/or deployment recognition device 28. The location process can use the reader 40 and time stamp to correct subsequent user U location data, and this processing may occur at the deployment recognition device 28 and/or at the central controller 32. Personal inertial navigation module 12 initialization status works in conjunction with the reader 40 feedback to the user U. To enter the location network, the inertial navigation module 12 requires initialization of the navigation algorithm. Thus, the reader 40 should understand the state of each personal inertial navigation module 12.

As discussed above, the "tag-in" event is used to notify the deployment recognition device 28 of this event and provide information for transmission to other devices 28. The particular device 28 associated with the user's radio 46 transmits an acknowledgment to the module 12, and at the same time, the immediate device 28 queries if the user's U data device 38 exists in the location database 54. If the data device 38 does not exist, the device 28 signals the reader 40 to report failure, thus turning the beacon 58 red. If the data device 38 does exist, the deployment recognition device 28 checks the status of the user's U associate module 12 initialization flag. If the initialization flag is set, the device 28 signals the reader 40 to report success, and the beacon 58 turns green. If the initialization flag is not set, the reader 40 waits for several seconds and flashes green while waiting. The user U should remain stationary for a few moments while he or she awaits confirmation. This stationary interval may be sufficient for the navigation algorithm to initialize, and after initialization, the module 12 communicates its status to the deployment recognition device 28 network, which in turn communicates the status to the reader 40. The reader 40 can then provide confirmation to the user U of location functionality. It is noted that this initialization occurs once upon power-up. In this manner, and for subsequent events, the initialization flag is true and reader 40 feedback is immediate. If the navigation algorithm fails to initialize, the initialization flag remains false, and the reader 40 will time out and turn red to indicate failure.

In another preferred and non-limiting embodiment, the system 10 and method of the present invention facilitates for multi-entry. Estimation of the vehicle V position and azimuth, in conjunction with readers 40 position relative to the vehicle V, facilitates multiple entry initialization in this embodiment. However, identifying and determining a common azimuth reference for placing multiple users U in the common frame of reference can occur through the methods, techniques, and systems shown and described in U.S. Patent Application No. 61/507,322, the contents of which are incorporated herein by reference in their entirety. In this embodiment, when a user U tags into the location network, his or her initial global position (and/or position in the common frame of reference) is known, and thereafter, the inertial navigation module 12 estimates the change in position from this initial position. Using the methods, techniques, and systems in the above-referenced patent application assists in aligning each track to the proper azimuth about the initial position.

In one particular implementation and preferred and non-limiting embodiment of the present invention, certain compatible devices include a data transfer device, such as data device 38, SCBA device 50, data device 76, and the like. In this embodiment, the data transfer device may include vendor identification code, product identification code, serial number, and a series of flags. Possible flags include the presence of a radio, radio type, and a radio mode. If the device contains a radio 46, the radio identification code can assume a hash of the event or identification code, product identification code, and serial number. Each device may communicate additional information over the radio link.

In another preferred and non-limiting embodiment, the radio 46 functions as a Bluetooth® piconet master node, and all products pair to this radio 46 rather than to each other. The radio 46 can include a radio frequency identification reader, button 74, and Bluetooth® radio. The button 74 activates the radio frequency identification scan, and upon successful detection of a compatible radio frequency identification device, the radio 46 contacts the associated device using the network name hash from the tag or data device. The radio 46 then indicates success or failure. As discussed above, the SCBA device 50 may also integrate with the radio 46, such that the SCBA device 50 includes any appropriate radio frequency identification components.

Some devices may require persistent association to the radio 46, such that the radio 46 is capable of storing a list of known associations to ensure seamless pairing. Capability to un-pair is also available. The data device 38 identifies the user U over the long range radio network, and the radio 46 "pairs" with this data device 38 in order to identify itself over the network. The radio 46 may function as a central communication device on the user U, while the personal inertial navigation module 12 includes the above-discussed sensors 14, controller 16, as well as a Bluetooth® radio and data device 76.

In another implementation and preferred and non-limiting embodiment, each vehicle V can include one deployment recognition device 28, GPS antenna 60 (optionally using the GPS antenna of the vehicle V), and one or more readers 40. All components can be mounted in fixed locations on the vehicle V, and after installation, the specific locations can be determined and stored in the configuration of the deployment recognition device 28. The GPS antenna 60 connects to a receiver on the deployment recognition device 28, and the deployment recognition device 28 and readers 40 connect via the CAN bus. The deployment recognition device 28 can be configured to provide long-range communication services, estimates of positions and headings of the vehicle V, and store incident information in the database 54. The radio 46 provides communications between the users U and other portions and components and users U in the system 10.

In this embodiment, and when multiple deployment recognition devices 28 are in the environment, it is envisioned that the devices 28 can be set up in master/slave relationships. Further, the deployment recognition device 28 can communicate to the central controller 32 (i.e., the computer of the incident commander) through standard Ethernet or WiFi networks. Further, in this embodiment, the deployment recognition device 28 is enabled for estimating its position and orientation, and/or the position and orientation of the vehicle V. These measurements assist in determining the relation between the location of all vehicles V on the scene, and all available vehicles V in the area. This facilitates dispatch optimization.

As discussed, the positioning system 34 can take a variety of forms, and in one preferred and non-limiting embodiment, is in the form of a global navigation satellite system (GNSS), such as GPS or GPS/Galileo, where the receiver provides the measurements relating to the absolute position of the vehicle V. A high-end implementation may include a receiver capable of reporting individual pseudoranges, carrier phase, and velocity measurements to the deployment recognition device 28. It is further envisioned that a pressure sensor 56, which is fixed to a stationary object, can be used to provide a pressure reference to the entire system 10. This reference allows mobile nodes to account for drift in the atmospheric pressure. Similarly, the inertial navigation system 36 of the device 28 allows tight integration with other navigation sensors to provide a more accurate estimate of the vehicle V position and orientation. An increase in position and orientation accuracy of the vehicle V translates to accuracy improvements when relating users U who initialize at one vehicle V (and/or deployment recognition device 28) to those who initialize at another vehicle V (and/or deployment recognition device 28). It may also improve performance in dense urban canyon-type environments with multipath issues. Of course, these systems and processes can be used in connection with a transportable deployment recognition device 28, as discussed above. Further, the CAN bus can connect the deployment recognition device 28 and the readers 40. This CAN bus provides a multi-master messaging bus with message priorities and hardware error correction.

In this manner, ground-based initialization components are eliminated, as well as the requirement to deploy special initialization systems. This preferred and non-limiting embodiment also minimizes the need for tag programming and permits multiple entry initialization. All vehicles V and users U are localized on a common frame of reference and/or a global coordinate system. The use of geographic information system (GIS) databases is facilitated, and the inertial navigation module 12 run-time is improved by eliminating other features required with having a radio frequency identification reader on or integrated with the module 12. Each user U can be tied to a specific vehicle V or team and audio and video confirmations are provided for the user U that they are properly located within the network and system 10.

In a still further preferred and non-limiting embodiment, the present system 10 and methods provide for further functionality relating to multi-entry initialization and deployment to thereby relate each user U in a common frame of reference and/or a global reference frame. For example, if each deployment recognition device 28 includes GNSS capabilities, and therefore can locate themselves within a common frame of reference, and each device 28 (or controller 30) includes the appropriate programming and algorithms to estimate the orientation of the vehicle V, it is possible to describe the position of any point on the vehicle V, including the reader 40 positions in the common frame of reference. For example, when a user U tags in, the device 28 on the vehicle V has knowledge of the user's global position, assuming that the user's position is equivalent to the position of the reader 40 (including an off-set). This location specifies the user's local origin. Given knowledge of the user's origin and change of position, the user's position in the common frame of reference and/or global reference frame can be described and determined.

In this preferred and non-limiting embodiment, each vehicle V includes a deployment recognition device 28 (or system) and one or more readers 40. Installation requires a technician to measure the location of each reader 40, deployment recognition device 28, GNSS antenna, and the vehicle V center relative to a known reference point. This reference point should be located on the ground, such that the device 28 has knowledge of each reader's 40 height above ground level. Table 1 lists the vehicle V measurements with respect to known reference a in the vehicle V body frame b. This information allows the device 28 to describe the location of each component relative to the navigation suite, and therefore their respective locations in the common frame of reference and/or global reference frame.

TABLE 1

Apparatus measurements

| Variable | Description |
|---|---|
| $r_{a/mi}^{b}$ | Location of tag-in module $m_i$, $i \in [1 \ldots n]$ |
| $r_{a/s}^{b}$ | Location of base station |
| $r_{a/g}^{b}$ | Location of GNSS antenna |
| $r_{a/c}^{b}$ | Location of vehicle center |

In this embodiment, multi-entry initialization requires the deployment recognition device 28 to perform three primary functions. First, the device 28 must communicate and maintain a common database 54 with all other devices 28. This database 54 contains essential parameters that relate to each user's unique output to a global coordinate system (or common frame of reference). Second, the device 28 must determine the global position of each reader 40. This information allows the system to relate the user's local estimate position to a global position at tag in. There, the deployment recognition device 28 controls the "tag-in" event.

In one exemplary embodiment, personal inertial navigation module b connects to deployment recognition device d, and then tags in to a reader 40 associated with deployment recognition device s. Each device d, s contains a separate piece of information necessary to describe the position of the personal inertial navigation module b. Device d receives position estimates from module b, and maintains historical data. When a user U tags in, device s equates the true position of the module b to that of the reader 40. Therefore, deployment recognition device d has a time-stamped history of the personal inertial navigation module b position estimate, while deployment recognition device s has knowledge of the personal inertial navigation module b true position at one instant in time. Neither device d, s can interpret the module b position in a common frame of reference and/or global reference frame.

TABLE 2

Base station network shared information

| Variable | Rate | Published by | Description |
|---|---|---|---|
| $(\varphi, \lambda, h)_s$ | 1 Hz | Base station s | Apparatus s center position |
| $\psi_s$ | 1 Hz | Base station s | Apparatus s azimuth rotation (or full orientation) |
| $(\varphi, \lambda, h)_b$ | ≪1 Hz | Base station s | Boot module b tag-in reference position |
| $t_b$ | ≪1 Hz | Base station s | Boot module b tag-in reference time |

TABLE 2-continued

Base station network shared information

| Variable | Rate | Published by | Description |
|---|---|---|---|
| $(\hat{r}_{z/mi}{}^t)_b$ | ≪1 Hz | Base station d | Boot module b tag-in estimate position |
| $\hat{t}_b$ | ≪1 Hz | Base station d | Boot module b tag-in estimate time |
| $ident_b$ | ≪1 Hz | Boot module b | Boot module b identification string |
| $status_b$ | ≪1 Hz | Boot module b | Boot module b status flags |

To handle this issue, and any potential problems where the module 12 switches to another deployment recognition device 28, a base station network can be generated to maintain a common database 54 of critical parameters. Table 2 lists these parameters. Each device 28 publishes its respective vehicle V global position $(\phi,\lambda,h)_s$ and orientation $\psi_s$. When a device 28 recognizes a "tag-in" event, it publishes the current reader 40 global position $(\phi,\lambda,h)_b$ and time stamp $t_b$ to the network as the module 12 true position. All devices 28 monitor for new "tag-in" events, and upon receipt of such a new event, each deployment recognition device 28 searches its historical data to determine if it contains the personal inertial navigation module 12 position estimate $\hat{r}_{z/b}{}^t$ with the nearest time stamp $\hat{t}_b$. The deployment recognition device 28, at least partially based on this information, then publishes it as $(\hat{r}_{z/m_i}{}^t)_b$ to the network. Arbitration favors the position estimate with the nearest time stamp. This approach allows any device 28 with a connection to a personal inertial navigation module 12 to describe that module 12 position estimate.

The network of the system 10 also contains personal inertial navigation module 12 status and identification fields. The status field allows the reader 40 to provide immediate feedback on the module 12 initialization and error status upon tag-in. The identification field allows the deployment recognition device 28 to relate reader 40 events via the user's data device 38 to the particular module 12 entry in the database 54. Deployment recognition devices 28 are responsible for synchronizing time between each other, GNSS when available, and all modules 12. Personal inertial navigation modules 12 synchronize their time via the deployment recognition device 28 global broadcast time stamp message in a simple control loop. Time synchronization error may cause a position mismatch and therefore lead to location error. In another preferred and non-limiting embodiment, the existing radio communication infrastructure can be utilized to ensure identical penetration and coverage characteristics and place no additional cost on the customer. A separate, high-band width, solution may allow sharing of location data between multiple devices in the system 10.

With continued reference to this preferred and non-limiting embodiment, and given the measurements from Table 1, WGS84 antenna position, and vehicle V orientation, the position of each component can be determined in WGS84 coordinates. To compute the position of reader, the WGS84 antenna position $(\phi,\lambda,h)_g$ is related to the ECEF coordinates $(x,y,z)_{e/g}{}^e$:

$$x_{e/g}{}^e = (N+h)\cos\phi\cos\lambda$$

$$y_{e/g}{}^e = (N+h)\cos\phi\sin\lambda$$

$$z_{e/g}{}^e = (N(1-e^2)+h)\sin\phi,$$

where $N=a/\sqrt{1-e^2\sin^2\phi}$. The Earth's ellipsoid Constance for all WGS84 coordinates are first eccentricity $e=\sqrt{(a^2-b^2)/a^2}$, semi-major access length a=6378137.0 m, and semi-minor access length b=6356752.31424518 m. In vector form, the ECEF antenna position can be described as $r_{e/g}{}^e$. Next, the process relates the measurement offset from Table 1 to ECEF coordinates $r_{g/m_i}{}^e = R_t^e R_b^t (r_{a/m_i}{}^b - r_{a/g}{}^b)$, where the rotation from tangent to ECEF coordinates is:

$$R_t^e = \begin{bmatrix} -\sin\phi\cos\lambda & -\sin\lambda & -\cos\phi\cos\lambda \\ -\sin\phi\sin\lambda & \cos\lambda & -\cos\phi\sin\lambda \\ \cos\phi & 0 & -\sin\phi \end{bmatrix},$$

and rotation $R_b^t$ represents the apparatus vehicle orientation from body to tangent frame. The ECEF position of the reader 40 is therefore: $r_{e/m_i}{}^e = r_{e/g}{}^e + r_{g/m_i}{}^e$. ECEF coordinates can be related to WGS84 coordinates using in iterative method. Variables $\{N,z,h,p\}$ are initialized using $(\phi,\lambda,h)_g$ and $r_{e/m_i}{}^e$, where $p=\sqrt{(x_{e/m_i}{}^e)^2+(y_{e/m_i}{}^e)^2}$, and are then iterated (until convergence):

$$\sin\phi = \frac{z}{N(1-e^2)+h}$$

$$\phi = \arctan\left(\frac{z+e^2 N\sin\phi}{p}\right)$$

$$N = \frac{a}{\sqrt{1-e^2\sin^2\phi}}$$

$$h = \frac{p}{\cos\phi} - N$$

The longitude is computed as $\lambda = \arctan 2(y_{e/m_i}{}^e, x_{e/m_i}{}^e)$, with the resulting location of $(\phi,\lambda,h)_{m_i}$.

As discussed above, and in one operational scenario according to the principals of the present invention, a user U tags into the system 10 using a reader 40. The reader 40 queries the deployment recognition device 28 for the status flags of the personal inertial navigation module 12 of the user U. The deployment recognition device 28 then publishes the "tag-in" event to the network database 54. Next, the deployment recognition device 28 searches the database 54 for the radio frequency identification code of the personal inertial navigation module 12, and then replies with the status flags of the module 12. If the module 12 does not exist in the database 54, the deployment recognition device 28 communicates this status to the reader 40. The reader 40 reports success, warning, or failure depending upon the state of the status flags of the personal inertial navigation module 12 of the user U.

In this scenario, all deployment recognition devices 28 (as well as the central controller 32) directly or indirectly receive notification of the "tag-in" event. Upon receipt of this information, each deployment recognition device 28 determines if it contains the corresponding position estimate to the reader 40 location. The deployment recognition device 28 receives the information regarding the "tag-in" event, and searches through historical data for the position estimate corresponding to the personal inertial navigation module 12 "tag-in" event. The deployment recognition device 28 then publishes corresponding position estimate and time stamp, if available. Finally, the deployment recognition device 28 notifies the personal inertial navigation module 12 of a successful "tag-in" event.

In a further preferred and non-limiting embodiment, the personal inertial navigation module 12 has three primary requirements regarding a multi-entry initialization event.

First, the module 12 must calibrate the magnetometer 26 for hard-iron distortions, and then estimate the track rotation error. Calibration requires that the personal inertial navigation module 12 estimate the unknown magnetometer 26 biases while the module 12 navigates. Since the inertial navigation module 12 does not have knowledge of its true azimuth angle upon initialization, it can estimate the track rotation error between its position estimate output and true north using, for example, the methods, techniques, and systems described in the above-referenced U.S. Patent Application No. 61/507,322. Second, the personal inertial navigation module 12 must synchronize its time to that of the deployment recognition device 28 and/or the central controller 32. Third, the personal inertial navigation module 12 outputs a time-stamped navigation data stream, and the deployment recognition devices 28 correlate this data to corresponding "tag-in" events of the user U.

In another preferred and non-limiting embodiment, the personal inertial navigation module 12 contains an algorithm or program on its controller 16 to estimate the track rotation error via in-situ calibration of the magnetometer 26 hard-iron biases. It is programmed or configured to output an azimuth rotation error that describes how this phase should rotate the navigation output (i.e., the track of the user U) to align with true north. This quantity will vary with time as the algorithm converges to its estimate.

According to the present invention, time synchronization permits synchronization of data and "tag-in" events. Since, in one preferred and non-limiting embodiment, each deployment recognition device 28 (or "base station") contains GNSS capabilities, that can provide an accurate time reference. The personal inertial navigation modules 12 synchronize via the deployment recognition device 28 global broadcast message and time stamp. For each time update, the module 12 completes a control loop:

$$t_{0,k+1} = t_{0,k} - K_p(t_{0,k} + \tau_k - t_{ref}),$$

where $t_{ref}$ represents the deployment recognition device 28 reference time, and gain $K_p < 1$. The personal inertial navigation module 12 outputs algorithm time $\tau$ and time of day offset $t_0$. Further, the output time of day can be determined using: $t = t_0 + \tau$.

In another preferred and non-limiting embodiment, and in support of the multi-entry initialization and deployment system 10, the personal inertial navigation module 12 outputs several critical data fields. The module 12 outputs a position estimate, track rotation error, time, and status messages. The module 12 position estimate represents its relative location since initialization of the navigation system in the module 12. This position estimate drifts with time and distance, and therefore provides short-term accuracy. Further, the position estimate is relative to an arbitrary origin z. In this embodiment, the output of one module 12 to another cannot be correlated without knowledge of each module 12 origin and initial heading. Output is directed to the azimuth rotation error resulting from initialization. Output $\tau$ and $t_0$ describe the algorithm time and time of day offset, respectively, where the output time stamp is $t = t_0 + \tau$. The personal inertial navigation module 12 also outputs an identification string and status flags. The identification string allows the deployment recognition device 28 to relate "tag-in" events to specific personal inertial navigation modules 12. The status flags communicate error in the initialization status. Table 3 summarizes these exemplary data fields.

TABLE 3

Boot module data stream

| Variable | Description |
| --- | --- |
| $r_{z/b}^t$ | Relative location of boot module |
| $\gamma$ | Track azimuth rotation correction |
| $\tau$ | Algorithm time |
| $t_0$ | Time of day offset to algorithm time |
| $ident_b$ | Identification string |
| $status_b$ | Status flags |

As illustrated in schematic form in FIG. 1, the central controller 32 is in communication with or otherwise associated with the display device 84. In one preferred and non-limiting embodiment, the display device 84 displays content generated by the central controller 32, and may include a three-dimensional framework similar to OpenGL, and is also configured to relate vectors between different coordinate systems (e.g., tangent/local, ECEF, and WGS84). In one preferred and non-limiting embodiment, a method to relate such coordinate systems begins with defining the tangent coordinate system origin as:

$$O^e = \frac{1}{n}\sum_{i=1}^{n} r_{e/c_i}^e$$

in ECEF coordinates, where the vehicle V center position $r_{e/c_i}^e$ comes from $(\phi,\lambda,h)_s$ in Table 2. Next, the ECEF position of each reader 40 reference point $(\phi,\lambda,h)_b$ is determined, where the tangent coordinates of each vehicle V and reader 40 are:

$$r_{t/c_i}^t = R_e^t(r_{e/c_i}^e - O^e)$$

$$r_{t/m_i}^t = R_e^t(r_{e/m_i}^e - O^e),$$

respectively. Since the personal inertial navigation module 12 already represents its track 82 and tangent coordinates, additional calculations are not required according to this methodology. Accordingly, the position of the personal inertial navigation module 12 and track 82 is determined as: $r_{t/b}^t = r_{t/m_i}^t + R_y(r_{z/b}^t - r_{z/m_i}^t)$, where $R_y$ represents the track rotation error correction as a rotation matrix. The display implementation can "push" calculations to the GPU using glTranslatef( ) and glRotatef( ) for efficiency.

In the above-described implementation where the deployment recognition device 28 is attached to or associated with a vehicle V, knowledge of the position and orientation of each vehicle V is determined. For example, if the vehicle V position estimate is five meters off, all personal inertial navigation modules 12 associated with that vehicle V will be five meters off. However, this error does not grow with time and distance. The relative accuracy between modules 12 on the same vehicle V will not change. Other possible error sources that should be considered include the location accuracy of the vehicle V, the orientation accuracy of the vehicle V, and other conditions that affect the location and orientation of the vehicle V. However, as discussed above, using a vehicle-based system provides certain benefits as well. Regardless of implementation, i.e., a vehicle-based deployment recognition device 28 arrangement or a transportable deployment recognition device 28 arrangement, the presently-invented system 10 and method provide an effective and accurate deployment and initialization technique.

In another preferred and non-limiting embodiment and implementation, accurate and effective communication between the deployment recognition device 28 and the personal inertial navigation module 12 is assumed. Accordingly, when the user U "tags-in" to the reader 40, both the deployment recognition device 28 and the personal inertial navigation module 12 communicate this event instantaneously and exchange information. Next, the module 12 performs it course alignment phase of initialization, as is known. At this time, the module 12 assumes position (0, 0, 0) and an orientation from the accelerometers 22 and magnetometers 26. As a result of biases and magnetic interference, the module 12 orientation, and, in particular, the azimuth angle, may not be acceptable. However, this can be addressed according to the above-discussed techniques, methods, and systems of the above-referenced U.S. Patent Application No. 61/507,322, where the module 12 provides an estimate and/or correction to its azimuth angle that can be applied prior to presentation at the display device 84 of the central controller 32.

According to one preferred and non-limiting embodiment, the user U walks to the deployment recognition device 28. In this scenario, it is assumed that the deployment recognition device 28 has a clear view of the horizon and acquires a reasonable GPS position estimate. When the user U tags in with the reader 40, the deployment recognition device 28 and personal inertial navigation module 12 can correlate the position estimate of the module 12 to the GPS position estimate of the deployment recognition device 28. The deployment recognition device 28 (or "base station") computes the module 12 position offset, such that the module 12 position plus the offset is equal to the deployment recognition device 28 position. Thereafter, the display device 84 (as controlled by the central controller 32) applies this offset to all future position estimates from the personal inertial navigation module 12. Provided that the deployment recognition device 28 has a clear view of the horizon and sufficient time to acquire reasonable GPS position estimate, users U can move the deployment recognition device 28 to another location and interact with the device 28, such as a "tag-in" event or similar interaction.

Next, in this preferred and non-limiting embodiment, it is recognized that multiple deployment recognition devices 28 can exist at the scene or in the environment provided that a communication infrastructure exists between the personal inertial navigation modules 12 and the deployment recognition device 28 associated with the "tag-in" event. Accordingly, in one scenario, a near-field communications device, such as a radio frequency identification reader (as part of the deployment recognition device 28) is used in connection with a dual-port radio frequency identification tag (data device 38 and/or data device 76). Alternatively, a cloud network of deployment recognition devices 28 can be established. Such communication may only be required if users U wish to tag in to different deployment recognition devices 28, since a user's U radio 46 may not be directly connected to the correct deployment recognition device 28.

Another benefit provided by the use of the above-discussed deployment recognition device 28 is that the programs and algorithms, e.g., the navigation routine 20, of the personal inertial navigation modules 12 can gain insight (i.e., observe) its initial biases from repeated "tag-in" events at the deployment recognition device 28. Accordingly, for example, during a "tag-in" event, the program or algorithm receives knowledge, e.g., measurement, of its current position. The program or algorithm then applies a measurement correction that adjusts its estimate to substantially match the measurement. Then, as the user U walks around, the navigation routine 20 propagates this position by integration of its inertial sensors 14. A subsequent "tag-in" event provides a second measurement. The navigation routine 20 then applies another measurement correction, where the correction prepares the algorithm's estimate with the measurement. The difference or residual is a result of measurement noise and integration of inertial sensor biases and noise. The algorithm can then correct the inertial sensor biases to improve future position estimates.

As discussed above, and in preferred and non-limiting embodiment, the deployment recognition device 28 is transportable, such that the user U can carry it into a structure, near a building, or in another location where, in one embodiment, it cannot acquire an acceptable GPS position estimate. Without GPS, the deployment recognition device 28 has no means to estimate its position intrinsically (unless it is using its internal inertial navigation system 36). Accordingly, if the deployment recognition device 28 has been moved and cannot estimate its position, it can either be provided with a position or assume a position. In one embodiment, the deployment recognition device 28 may use radio frequency ranging to towers placed around the incident using radio frequency arranging technology.

In another preferred and non-limiting embodiment, the deployment recognition device 28 "assumes" a position. When the user U interacts with the deployment recognition device 28, the device 28 indicates that the user is at (0, 0, 0). As discussed above, the deployment recognition device 28, and specifically the controller 30, can be programmed or configured to estimate its own azimuth angle. However, if the approach is to "assume" a position of the deployment recognition device 28, this assumption is lost if the deployment recognition device 28 is moved.

Accordingly, and as discussed above, the deployment recognition device 28 can alternatively set its position to the user's U position, i.e., the position of the personal inertial navigation module 12 of the user U. As also discussed above, and in one preferred and non-limiting embodiment, the deployment recognition device 28 includes two operational modes, namely initialization and ready mode. In the initialization mode, the device 28 does not have a current position estimate. When a "tag-in" event occurs, the device 28 acquires the position of the user's U module 12 position estimate and assumes it as its own position estimate (including the appropriate offsets described above). The device 28 then switches into ready mode, where the deployment recognition device 28 uses its previously-acquired position estimate. When a "tag-in" event occurs, the deployment recognition device 28 communicates this position estimate to the personal inertial navigation module 12. The module 12 then corrects its position, as discussed. However, when the deployment recognition device 28 detects motion, such as through the sensor 42, the sensors of the inertial navigation system 36, or the like, it switches back into initialization mode and awaits for a "tag-in" event. Since all users U are already on the common frame of reference, i.e., the same coordinate system, any user U can then tag in to set the deployment recognition device 28 new position. It is further noted that the deployment recognition device 28 can easily keep track of the users U on the same coordinate system and those who are not through the interaction with the reader 40 (or "tag-in" event).

In another preferred and non-limiting operational scenario, three users A, B, and C arrive on scene. It is assumed that each user's module 12 performs a course alignment and is therefore navigating. Each module 12 reports a position estimate, each in their own arbitrary coordinate system, with coordinate alignment flag set as false. User A deploys the deployment recognition device 28 (in initialization mode) by picking up the device 28 and placing it on scene in a convenient location. Without loss of generality, it is assumed that user A (or any user) then tags into the device 28. The device 28 acquires the position of user A and enters ready mode, and the coordinate alignment flag of user A is true. The display device 84 of the central controller 32 can now generate a representation of both user A and the deployment recognition device 28 on the display device 84.

Next, user B tags into the deployment recognition device 28 (in ready mode) and user B coordinate alignment flag is now true. User B assumes the coordinate system of user A via the deployment recognition device 28. The display device 84 now represents and displays user A and B, as well as the deployment recognition device 28. Next, user C picks up the deployment recognition device 28, which moves the device 28 into initialization mode. User C does not tag in at that point, and instead carries the device 28 to a new location. If user C tries to tag in, the device 28 reports an error, since it knows that user C has not tagged in, and the deployment recognition device 28 already has a position estimate. The display device 84 changes the icon of the deployment recognition device 28 (or removes it) to indicate that its position is now unknown. Subsequently, either user A or B tag into the deployment recognition device 28 to change it to ready mode. In this scenario, user B tags in to the deployment recognition device 28 (in ready mode) and then decides to move the deployment recognition device 28 to a new location, such that the device 28 again enters initialization mode. At this point, user B forgets to tag in, such that the deployment recognition device 28 is still in initialization mode. At this point, user A tags in to the deployment recognition device 28 (in ready mode); however, users A and B, as well as the device 28, remain on user A's original coordinate system.

With continued reference to this scenario, and with the exception of user B's initial "tag-in" event, the deployment recognition device 28 has been hopping around to different positions and acquiring new position estimates from the interaction with the user's U personal inertial navigation modules 12. However, it has not provided any new information to the modules 12. Now, user B tags in, and since the deployment recognition device 28 is ready, user B position corrects to the deployment recognition device 28 position estimate (as set by user A). User C now tags in and assumes the deployment recognition device 28 position estimate. User C is now represented on the display device 84. User A walks around and then returns to the deployment recognition device 28 and tags in. User A now assumes the position of the deployment recognition device 28, which was previously established based upon user A. Therefore, any drift that accumulated while walking around by user A has been eliminated.

Accordingly, and in this preferred and non-limiting implementation and embodiment, the deployment recognition device 28 provides a technique for saving the position of the user U, and restoring this position at a later time. When this position is restored, any accumulated drift since the last saved position will be eliminated. In addition, and in a GPS-denied environment, the deployment recognition device 28 obtains and/or sets its position based upon the position information and navigation data 18 of the personal inertial navigation module 12.

In this manner, the presently-invented system 10 and methods provide an effective means for tracking and placing multiple users U, features, items, objects, and the like in a common frame of reference. Further, the present invention facilitates the accurate initialization, deployment, and/or subsequent location in this common frame of reference. The navigational deployment and initialization system 10 and methods of the present invention, as described above, allow for single entry or multi-entry for the users U and minimize the user U requirements for initialization and/or deployment.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A navigational deployment and initialization system, comprising:
    at least one personal inertial navigation module associated with at least one user and comprising a plurality of sensors and at least one controller configured to generate navigation data derived at least in part upon output of the plurality of sensors and at least one navigation routine;
    at least one deployment recognition device configured to directly or indirectly receive at least one of the following: user data, time data, event data, navigation data, or any combination thereof; and
    at least one central controller in direct or indirect communication with the at least one deployment recognition device and configured to receive at least a portion of at least one of the following: the user data, the time data, the event data, the navigation data, or any combination thereof,
    wherein the at least one deployment recognition device is further configured to:
        enter an initialization mode, wherein a position of the at least one deployment recognition device is not set;
        receive at least a portion of the navigation data of the at least one personal inertial navigation module of a user sufficient to determine a user position;
        determine the position of the at least one deployment recognition device in the common frame of reference based at least in part upon at least a portion of the navigation data of the at least one personal inertial navigation module of the user; and
        enter a ready mode, wherein the position of the at least one deployment recognition device is set to the determined position.

2. The system of claim 1, wherein the at least one deployment recognition device comprises at least one positioning system configured to determine a position of the deployment recognition device in a common frame of reference.

3. The system of claim 2, wherein the positioning system comprises at least one of the following: a global positioning system, a geographic information system, a navigation-enabled system, a radio frequency ranging system, an inertial navigation system, or any combination thereof.

4. The system of claim 1, wherein the at least one deployment recognition device is configured to determine a position of the at least one deployment recognition device in a common frame of reference based at least in part upon at least a portion of the navigation data of the at least one personal inertial navigation module.

5. The system of claim 1, wherein the at least one deployment recognition device is configured to set a position of the at least one deployment recognition device in a common frame of reference.

6. The system of claim 1, wherein the position of the at least one user in a common frame of reference is adjusted based at least partially on the position of the at least one deployment recognition device in the common frame of reference.

7. The system of claim 1, wherein the at least one deployment recognition device is transportable between a first position and at least one subsequent position.

8. The system of claim 7, wherein at least one of the first position and the at least one subsequent position in a common frame of reference is determined based at least in part upon at least a portion of the navigation data of the at least one personal inertial navigation module.

9. The system of claim 7, wherein the at least one deployment recognition device comprises at least one positioning system, and wherein at least one of the first position and the at least one subsequent position in the common frame of reference is determined at least in part by output data of the at least one positioning system.

10. The system of claim 7, further comprising at least one sensor configured to sense movement of the at least one deployment recognition device.

11. The system of claim 1, further comprising at least one data device associated with the at least one user and configured with at least one of the following: user data, time data, event data, navigation data, or any combination thereof.

12. The system of claim 11, wherein the at least one deployment recognition device comprises at least one radio frequency identification reader, and the at least one data device is in the form of a radio frequency identification device.

13. The system of claim 1, further comprising at least one communication device associated with the user and configured for direct or indirect communication with at least one of the following: the at least one personal inertial navigation module, the at least one deployment recognition device, the at least one central controller, at least one data device, or any combination thereof.

14. The system of claim 13, wherein the communication device comprises at least one radio configured for at least one of short-range communication and long-range communication.

15. The system of claim 1, further comprising at least one database comprising at least one of the following: user data, time data, event data, navigation data, common frame of reference data, position data, personal inertial navigation module data, deployment recognition device data, central controller data, communication device data, or any combination thereof.

16. The system of claim 15, wherein the at least one database is dynamically updated.

17. The system of claim 1, wherein the at least one deployment recognition device is located on at least one vehicle.

18. The system of claim 17, wherein the at least one deployment recognition device is permanently affixed to the at least one vehicle in a specified position.

19. The system of claim 17, wherein the at least one deployment recognition device is in direct or indirect communication with at least one positioning system of the at least one vehicle.

20. A computer-implemented method of determining a position of at least one deployment recognition device in a common frame of reference in which a plurality of users are navigating, each user having at least one personal inertial navigation module associated therewith and comprising a plurality of sensors and at least one controller configured to generate navigation data derived at least in part upon output of the plurality of sensors and at least one navigation routine, the computer-implemented method comprising:
  receiving, by the at least one deployment recognition device, at least a portion of the navigation data of the at least one personal inertial navigation module of a user;
  determining, by the at least one deployment recognition device, a position in the common frame of reference based at least in part upon at least a portion of the navigation data of the at least one personal inertial navigation module of the user;
  entering, by the at least one deployment recognition device, an initialization mode, wherein a position of the at least one deployment recognition device is not set;
  receiving, by the at least one deployment recognition device, at least a portion of the navigation data of the at least one personal inertial navigation module of a user sufficient to determine a user position;
  determining, by the at least one deployment recognition device, the position of the at least one deployment recognition device in the common frame of reference based at least in part upon at least a portion of the navigation data of the at least one personal inertial navigation module of the user; and
  entering, by the at least one deployment recognition device, a ready mode, wherein the position of the at least one deployment recognition device is set to the determined position.

21. The computer-implemented method of claim 20, wherein the determined position is at least one of a first position and a subsequent position.

22. The computer-implemented method of claim 20, further comprising:
  sensing, by the at least one deployment recognition device, movement from the position of the at least one deployment recognition device; and
  entering, by the at least one deployment recognition device, the initialization mode.

23. The computer-implemented method of claim 20, further comprising setting, by the at least one deployment recognition device, a user position in the common frame of reference based at least in part on the position of the at least one deployment recognition device.

* * * * *